United States Patent [19]

Ohtsuka et al.

[11] Patent Number: 5,602,614
[45] Date of Patent: Feb. 11, 1997

[54] CAMERA

[75] Inventors: Masanori Ohtsuka; Takanobu Tsunemiya; Yuuichi Matsuda, all of Kanagawa-ken, Japan

[73] Assignee: Canon Kabushiki Kaisha, Tokyo, Japan

[21] Appl. No.: 485,165

[22] Filed: Jun. 7, 1995

Related U.S. Application Data

[63] Continuation of Ser. No. 9,866, Jan. 26, 1993, abandoned.

[30] Foreign Application Priority Data

Jan. 31, 1992 [JP] Japan .................................. 4-040735

[51] Int. Cl.⁶ .............................. G03B 7/00; G03B 15/03
[52] U.S. Cl. ..................... 396/61; 396/65; 396/257
[58] Field of Search ................................. 354/413, 416, 354/417, 421, 423, 195.1

[56] References Cited

U.S. PATENT DOCUMENTS

| | | | |
|---|---|---|---|
| 4,345,825 | 8/1982 | Matteson et al. | 354/416 |
| 4,425,033 | 1/1984 | Yukio et al. | 354/423 |
| 4,603,954 | 8/1986 | Egawa et al. | 354/413 |
| 4,669,850 | 6/1987 | Uchiyama et al. | 354/416 |
| 5,291,237 | 3/1994 | Tagami et al. | 354/413 |

*Primary Examiner*—Russell E. Adams
*Attorney, Agent, or Firm*—Robin, Blecker, Daley & Driscoll

[57] ABSTRACT

A camera includes a distance detecting device arranged to detect a distance from the camera to an object to be photographed and to output distance information, a flash amount deciding part arranged to decide an amount of flash emission on the basis of the distance information from the distance detecting device, and an aperture value deciding part arranged to decide an aperture value to be used at the time of starting flash emission on the basis of the amount of flash emission.

28 Claims, 27 Drawing Sheets

FIG.9(a)

| DISTANCE | DISTANCE CODE |
|---|---|
| 24.0 m | 0 |
| 20.2 m | 1 |
| 17.0 m | 2 |
| 14.3 m | 3 |
| 12.0 m | 4 |
| 10.1 m | 5 |
| 8.5 m | 6 |
| 7.1 m | 7 |
| 6.0 m | 8 |
| 5.0 m | 9 |
| 4.2 m | 10 |
| 3.6 m | 11 |
| 3.0 m | 12 |
| 2.5 m | 13 |
| 2.1 m | 14 |
| 1.8 m | 15 |
| 1.5 m | 16 |
| 1.3 m | 17 |
| 1.1 m | 18 |
| 0.9 m | 19 |
| 0.75 m | 20 |
| 0.63 m | 21 |

FIG.9(b)

| DISTANCE CODE | GNO |
|---|---|
| 0 | 50.0 |
| 1 | 42.0 |
| 2 | 35.4 |
| 3 | 29.7 |
| 4 | 25.0 |
| 5 | 21.0 |
| 6 | 17.7 |
| 7 | 14.9 |
| 8 | 12.5 |
| 9 | 10.5 |
| 10 | 8.8 |
| 11 | 7.4 |
| 12 | 6.3 |
| 13 | 5.3 |
| 14 | 4.4 |
| 15 | 3.7 |
| 16 | 3.1 |
| 17 | 2.59 |
| 18 | 2.21 |
| 19 | 1.86 |
| 20 | 1.56 |
| 21 | 1.31 |

FIG.9(c)

| DISTANCE CODE | TIME BETWEEN START AND STOP OF FLASHING |
|---|---|
| 0 | — |
| 1 | 520 μs |
| 2 | 300 μs |
| 3 | 230 μs |
| 4 | 204 μs |
| 5 | 197 μs |
| 6 | 178 μs |
| 7 | 156 μs |
| 8 | 134.4 μs |
| 9 | 118.0 μs |
| 10 | 101.2 μs |
| 11 | 88.0 μs |
| 12 | 81.8 μs |
| 13 | 76.8 μs |
| 14 | 65.2 μs |
| 15 | 61.3 μs |
| 16 | 57.6 μs |
| 17 | 52.4 μs |
| 18 | 48.3 μs |
| 19 | 45.0 μs |
| 20 | 41.2 μs |
| 21 | 38.6 μs |

FIG.17(a)

| DISTANCE | DISTANCE CODE |
|---|---|
| 25.0 m | 0 |
| 19.32 m | 1 |
| 14.9 m | 2 |
| 11.5 m | 3 |
| 8.8 m | 4 |
| 6.8 m | 5 |
| 5.3 m | 6 |
| 4.1 m | 7 |
| 3.1 m | 8 |
| 2.4 m | 9 |
| 1.85 m | 10 |
| 1.43 m | 11 |
| 1.11 m | 12 |
| 0.86 m | 13 |
| 0.65 m | 14 |
| 0.50 m | 15 |
| 0.39 m | 16 |
| 0.29 m | 17 |
| 0.23 m | 18 |
| 0.18 m | 19 |
| 0.14 m | 20 |
| 0.106 m | 21 |

FIG.17(b)

| DISTANCE CODE | GNO |
|---|---|
| 0 | 50.0 |
| 1 | 42.0 |
| 2 | 35.4 |
| 3 | 29.7 |
| 4 | 25.0 |
| 5 | 21.0 |
| 6 | 17.7 |
| 7 | 14.9 |
| 8 | 12.5 |
| 9 | 10.5 |
| 10 | 8.8 |
| 11 | 7.4 |
| 12 | 6.3 |
| 13 | 5.3 |
| 14 | 4.4 |
| 15 | 3.7 |
| 16 | 3.1 |
| 17 | 2.59 |
| 18 | 2.21 |
| 19 | 1.86 |
| 20 | 1.56 |
| 21 | 1.31 |

FIG.17(c)

| DISTANCE CODE | TIME BETWEEN START AND STOP OF FLASHING |
|---|---|
| 0 | — |
| 1 | 520 μs |
| 2 | 300 μs |
| 3 | 230 μs |
| 4 | 204 μs |
| 5 | 197 μs |
| 6 | 178 μs |
| 7 | 156 μs |
| 8 | 134.4 μs |
| 9 | 118.0 μs |
| 10 | 101.2 μs |
| 11 | 88.0 μs |
| 12 | 81.8 μs |
| 13 | 76.8 μs |
| 14 | 65.2 μs |
| 15 | 61.3 μs |
| 16 | 57.6 μs |
| 17 | 52.4 μs |
| 18 | 48.3 μs |
| 19 | 45.0 μs |
| 20 | 41.2 μs |
| 21 | 38.6 μs |

FIG.18

| DISTANCE CODE | APERTURE VALUE |
|---|---|
| 0 | 2.00 |
| 1 | 2.18 |
| 2 | 2.38 |
| 3 | 2.59 |
| 4 | 2.83 |
| 5 | 3.08 |
| 6 | 3.36 |
| 7 | 3.67 |
| 8 | 4.00 |
| 9 | 4.36 |
| 10 | 4.76 |
| 11 | 5.19 |
| 12 | 5.66 |
| 13 | 6.17 |
| 14 | 6.73 |
| 15 | 7.34 |
| 16 | 8.00 |
| 17 | 8.72 |
| 18 | 9.51 |
| 19 | 10.37 |
| 20 | 11.31 |
| 21 | 12.34 |
| 22 | 13.45 |
| 23 | 14.67 |
| 24 | 16.00 |
| 25 | 17.45 |
| 26 | 19.03 |
| 27 | 20.75 |
| 28 | 22.63 |
| 29 | 24.68 |
| 30 | 26.91 |
| 31 | 29.34 |
| 32 | 32.00 |
| 33 | 32.00 |
| 34 | 32.00 |
| 35 | 32.00 |
| 36 | 32.00 |
| 37 | 32.00 |
| 38 | 32.00 |
| 39 | 32.00 |
| 40 | 32.00 |
| 41 | 32.00 |
| 42 | 32.00 |
| 43 | 32.00 |

F I G. 21
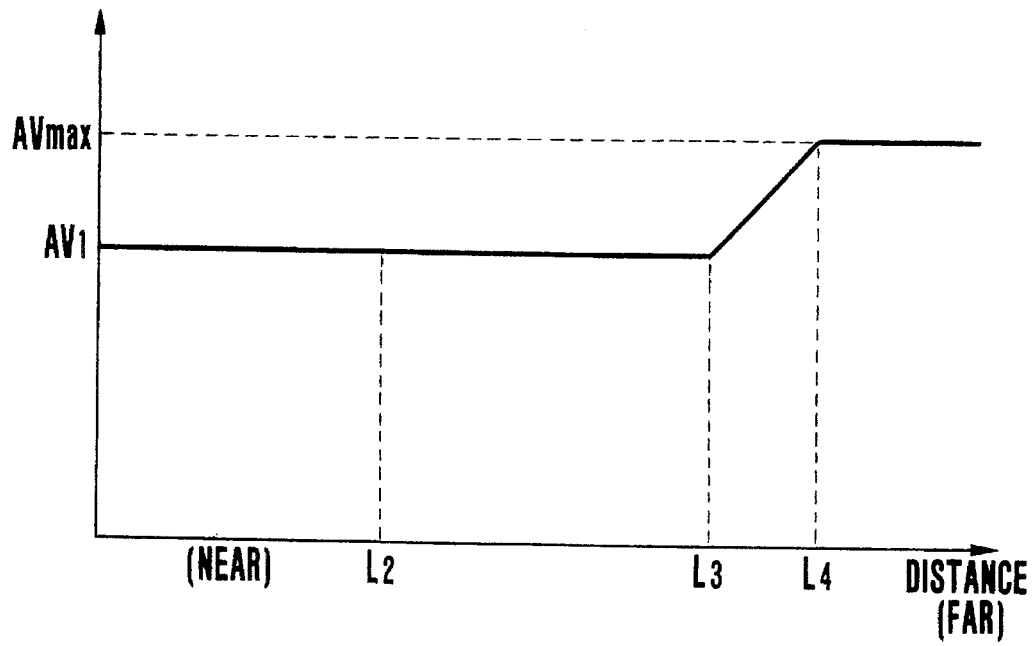
F I G. 22
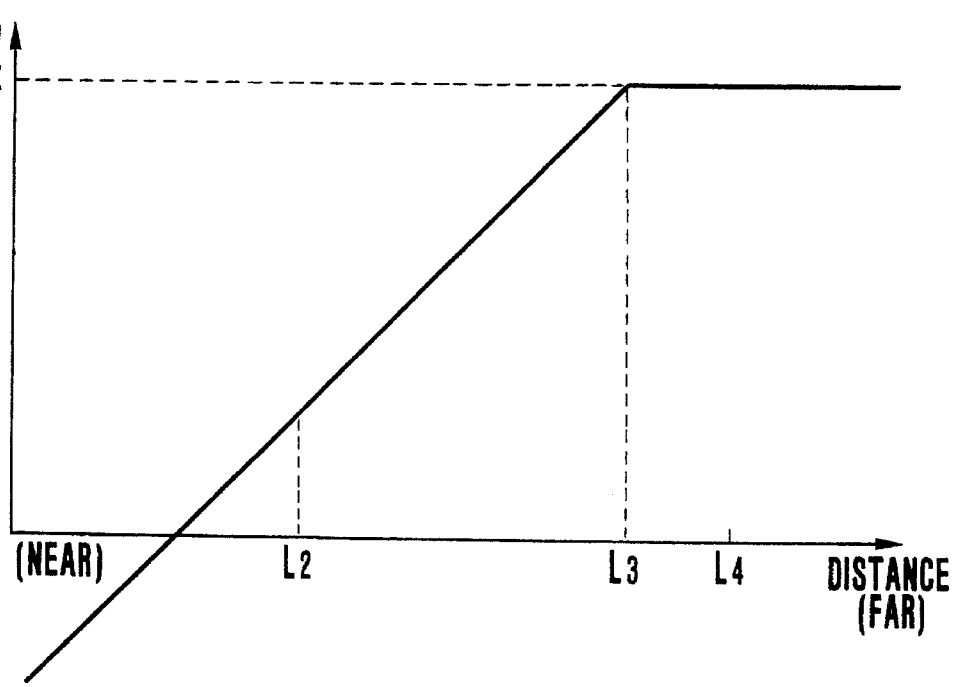

CAMERA

This is a continuation application under 37 CFR 1.62 of prior application Ser. No. 08/009,866, filed Jan. 26, 1993 (abandoned).

BACKGROUND OF THE INVENTION

1. Field of the Invention

This invention relates to a camera arranged to be capable of varying the amount of flash light emission.

2. Description of the Related Art

It has been known to arrange a flash device to accumulate electric energy in a main capacitor to a given capacity level by boosting the voltage of a battery which is provided as a power source for a camera and then to excite and allow a xenon lamp to flash at a given timing. The use of the flash device effectively prevents an object to be photographed from becoming too dark in a dark scene or under a back light condition.

An improvement over the flash device which is also known is arranged to measure the reflected light of the object resulting from flashing and to stop the flash device from flashing when the reflected light reaches a predetermined value of light quantity on an image plane. This arrangement is called a flash light control device. The use of the flash light control device broadens a flash device interlocking range (by preventing an over-exposure for a near distance). It also saves any nearby person from being dazzled too much. This device is widely in use for single-lens reflex cameras on account of these merits.

Meanwhile, cameras of the kind having a distance measuring device for automatically measuring a distance to the object have recently increased in number. The cameras of the kind arranged to be capable of varying their focal lengths and also the cameras of the kind having a flash device of a high guide number also have increased.

However, the use of the above-stated flash light control device for these cameras necessitates an optical system and an electric circuit for measuring reflected light at the time of flashing and also means for actually fitting them, and thus has presented a problem in respect of space and cost. This problem is not only serious for single-lens reflex cameras but especially serious for low-priced, lens-shutter type cameras having various functions, because of lack of space or limited cost.

Another problem lies in that the flash light control on the basis of reflected light of the object resulting from flashing depends on the reflection factor of the object and also those of ambient things. It has been, therefore, sometimes difficult to make an apposite exposure. In accordance with the conventional flash light control method, the photographed face of a person, for example, often becomes darker in a case where he or she is in front of a golden background, and sometimes becomes blankly white when he or she is in front of a background which is blackish as a whole.

Further, in accordance with the arrangement of the conventional flash light control device, the photoelectric current obtainable from the reflected light of the object is very weak. Therefore, the flash light quantity sometimes becomes greatly insufficient through the flash light control due to some flashing noise or the like. To prevent this, the conventional flash light control device necessitates a great amount of efforts and parts for actual applications. Further, the value of light quantity on the image plane becomes unreliable when some dust or a waterdrop sticks to an optical system for flash light control or when shots are taken in the rain.

A further problem with the conventional device lies in that: Although the flash light is not extremely dazzling, it is still dangerous for children's eyes to flash at them from a short distance. In view of this, some people wish to take a picture with the guide number of the flash device lowered. There is another desire to vary the ratio of the flash light to daylight under some distance condition in connection with wide-field distance measurement. There is also a desire for taking a near distance shot while increasing the depth of field.

SUMMARY OF THE INVENTION

It is one aspect and the principal object of this invention to provide a camera having a flash light control device which is capable of solving the above-stated problems of the prior art.

To attain this object, a camera having a flash light control device arranged according to this invention to automatically decide a quantity of light to be emitted from a flash device on the basis of input information on a measured distance comprises: flashing amount deciding means for deciding the amount of light emission at the time of flashing on the basis of information on a measured distance obtained from distance measuring means; aperture control means for deciding an aperture value on the basis of a flashing amount decided by the flashing amount deciding means; and light emission amount control means for controlling the quantity of flash light to be emitted from the flash device in such a way as to have the flash light emitted in a quantity coinciding with the flashing amount decided by the flashing amount deciding means.

The above and other objects, aspects and features of this invention will become apparent from the following detailed description of embodiments thereof taken in connection with the accompanying drawings.

BRIEF DESCRIPTION OF THE DRAWINGS

FIGS. 9(a), 9(b) and 9(c) show relations among the object distance, distance codes, the Gno and the period of time between the start and stop of flashing related to the operation of the camera shown in FIG. 8.

FIGS. 17(a), 17(b) and 17(c) show relations obtained among the object distance, the distance code, the Gno and the period of time between the start and stop of flashing related to the operation shown in FIG. 16.

FIG. 18 shows a relation obtained between the distance code and the aperture value related to the operation of the camera shown in FIG. 16.

FIG. 21 is a graph showing a relation obtained between the object distance and the aperture value in the operation of the camera shown in FIG. 20.

FIG. 22 is a graph showing a relation obtained between the object distance and the Gno in the operation of the camera shown in FIG. 20.

DETAILED DESCRIPTION OF THE PREFERRED EMBODIMENTS

This invention is described in detail below through preferred embodiments thereof:

EMBODIMENT I

Figure 1:
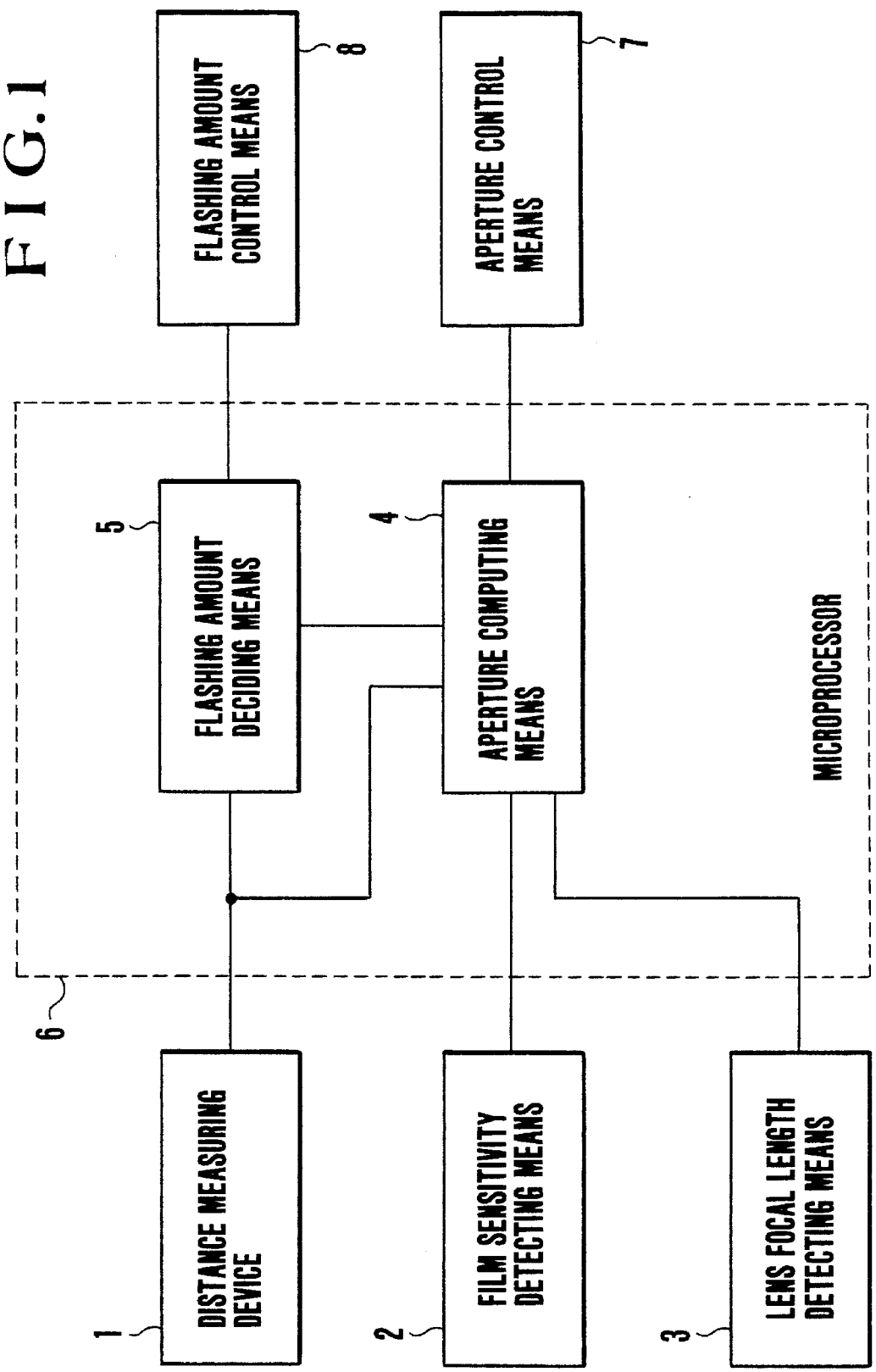
FIG. 1 is a block diagram showing in outline the arrangement of a camera including a first embodiment of this invention.

FIG. 1 shows in a block diagram the arrangement of the essential parts of a lens-shutter type camera which is provided with a first embodiment of this invention.

Referring to FIG. 1, a known distance measuring device 1 is arranged to measure a distance from the camera to an object to be photographed. Film sensitivity detecting means 2 is arranged to detect the sensitivity of a film in use from a DX code provided on the surface of a film cartridge. Lens focal length detecting means 3 is arranged to detect the focal length of a lens which is, for example, a zoom lens. Aperture computing means 4 is arranged to compute an aperture value to be set in a case where flash light is to be emitted from a flash device according to a flash device guide number (hereinafter referred to as Gno) computed by flashing amount deciding means 5 and information on the object distance coming from the distance measuring device 1 and further to correct the aperture value according to the film sensitivity detected and information on the focal length of the lens. The flashing amount deciding means 5 is arranged to decide a Gno on the basis of the object distance information from the distance measuring device 1. A microprocessor 6 is provided with the above-stated aperture computing means 4 and the flashing amount deciding means 5 and is arranged to perform overall control for various circuits of the camera and the flash light control device. Aperture control means 7 is arranged to control the aperture value for flashing on the basis of information from the aperture computing means 4. Flashing amount control means 8 includes various circuits of the flash light control device and controls the amount of flash light emission in such a way as to make it coincide with a flashing amount set by the flashing amount deciding means 5.

Figure 2:
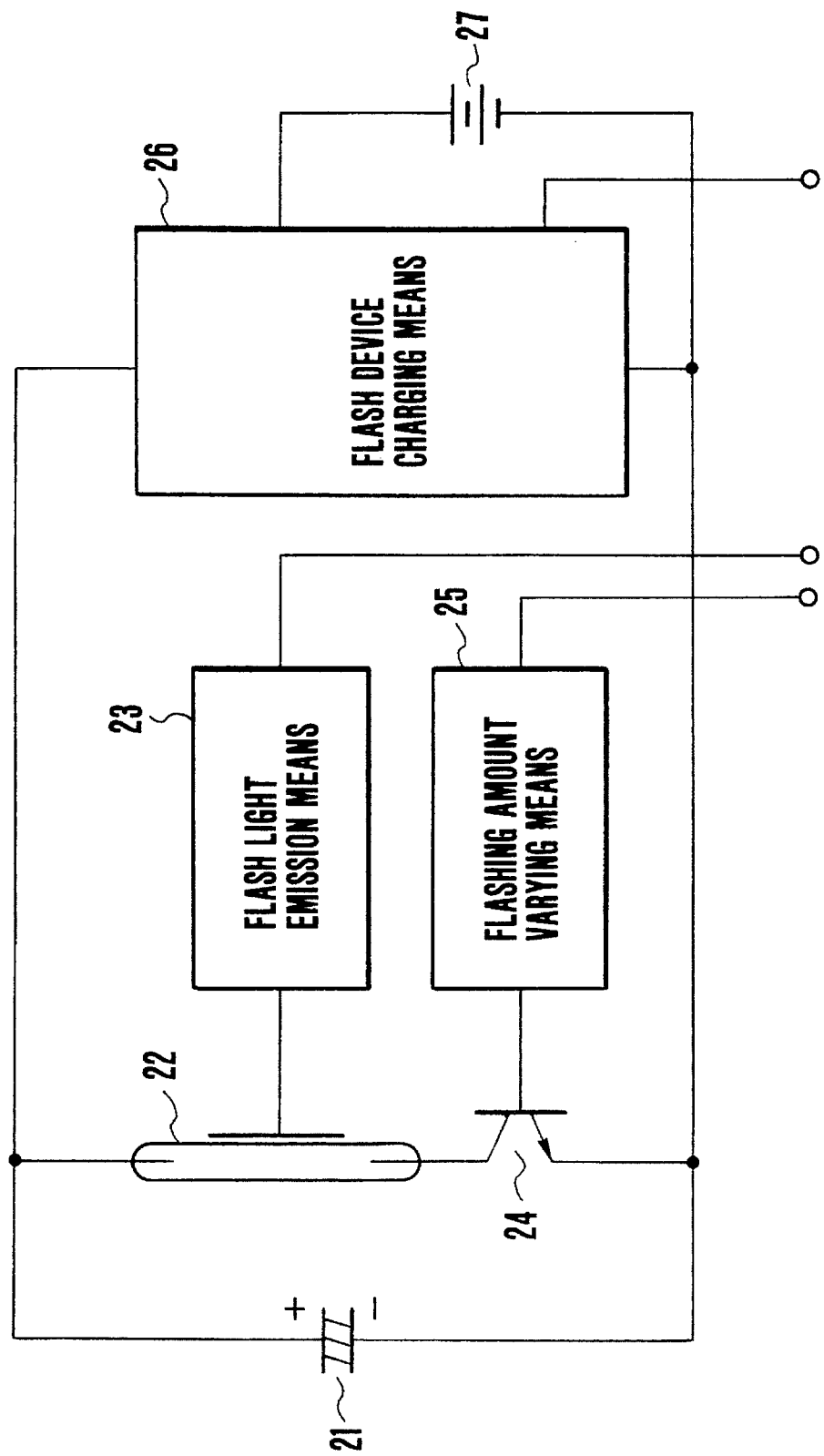
FIG. 2 is a circuit diagram showing by way of example the arrangement of flashing amount control means to be used for each of various embodiments of this invention.

FIG. 2 is a circuit diagram showing by way of example the arrangement of the flashing amount control means 8 which is provided for varying the amount of flash light emission. Referring to FIG. 2, a main capacitor 21 is arranged to accumulate energy for flashing, i.e., flash light emission. A xenon lamp 22 is provided for flashing. Flash light emission means 23 is arranged to cause flashing by exciting the xenon lamp 22. A switching element 24 is arranged between the xenon lamp 22 and the main capacitor 21 to cause a flashing current to flow or to be cut off halfway during the process of flashing. Flashing amount varying means 25 is arranged to vary the flashing amount by controlling the switching element 24. Flash device charging means 26 is connected to a battery 27 which is employed as a power source. The charging means 26 is arranged to boost the voltage of the battery 27 up to a predetermined level and to have the electric charge of it accumulated by the main capacitor 21.

Figure 3:
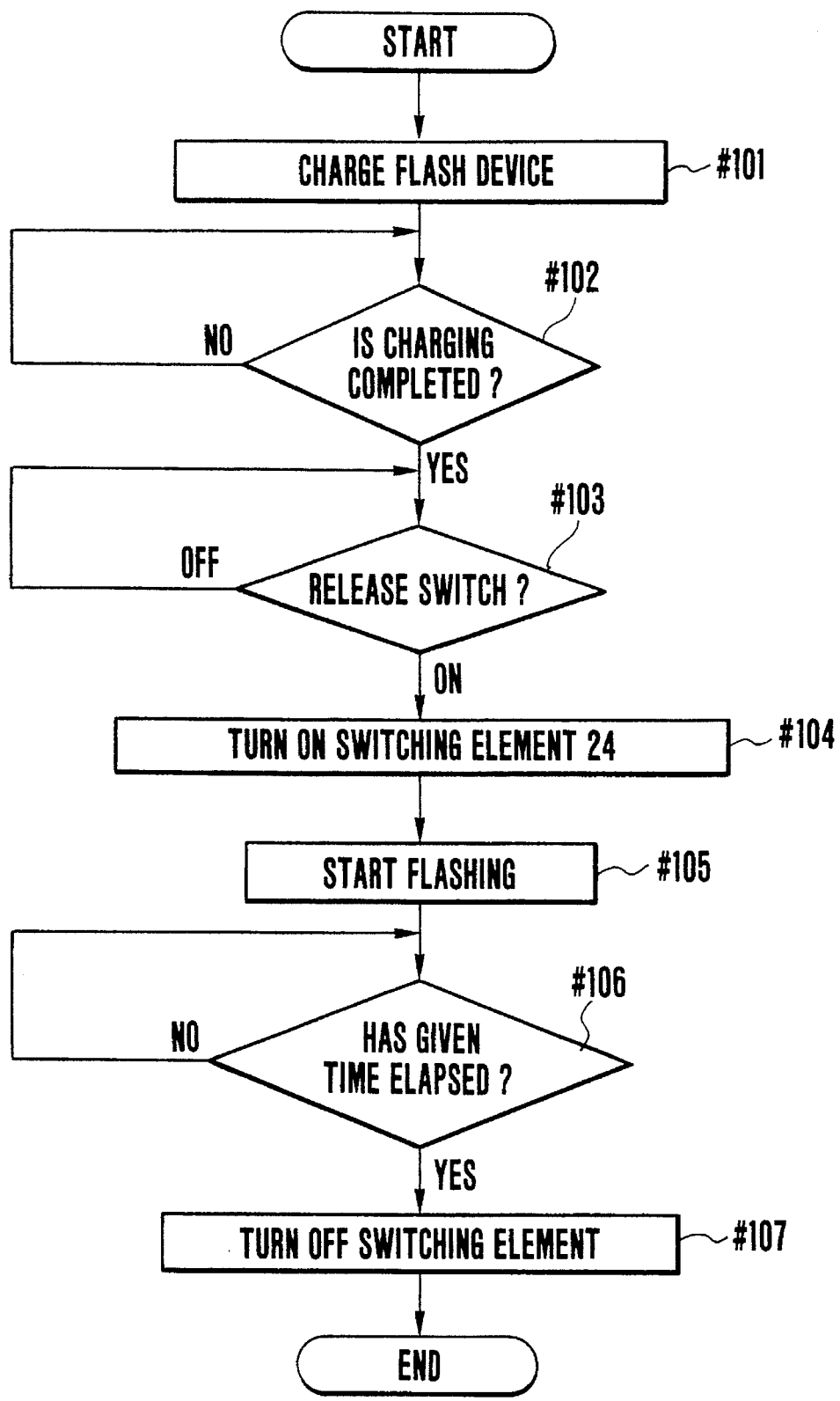
FIG. 3 is a flow chart showing the operation of the flashing amount control means of FIG. 2.

FIG. 3 shows in a flow chart the operation of the flashing amount control means 8 which is arranged as described above with reference to FIG. 2. The flow of operation of the flashing amount control means 8 is described below with reference to FIG. 3:

At a step 101, when a charging start signal is inputted from the microprocessor 6 shown in FIG. 1, the flash device charging means 26 is caused to begin to charge the main capacitor 21. At a step 102, a check is made to find if the main capacitor 21 has been charged up to a given amount. If not, the flow of operation remains at this step. If so, the flow proceeds to a step 103. At the step 103, a check is made, through a control signal coming from the camera body, to find if a shutter release switch which is not shown but is arranged to be turned on by a second stroke of a release button is in an on-state. If not, the flow remains at the step 103. When the release switch is turned on after that, the flow proceeds to a step 104. At the step 104, a picture taking action begins with the release switch turned on. Following this action, the flashing amount varying means 25 turns the switching element 24 on. At a step 105, when the time to flash comes, the flash light emission means 23 outputs a trigger signal to excite the xenon lamp 22. This causes flashing to begin. At a step 106, a check is made to find if a given period of time has elapsed after commencement of flashing. If not, the flow remains at the step 106. Upon the lapse of this period of time, the flow proceeds to a step 107. At the step 107, the flashing amount varying means 25 causes the switching element 24 to turn off to bring the flashing to a stop. A flashing amount control action thus comes to an end.

Figure 4:
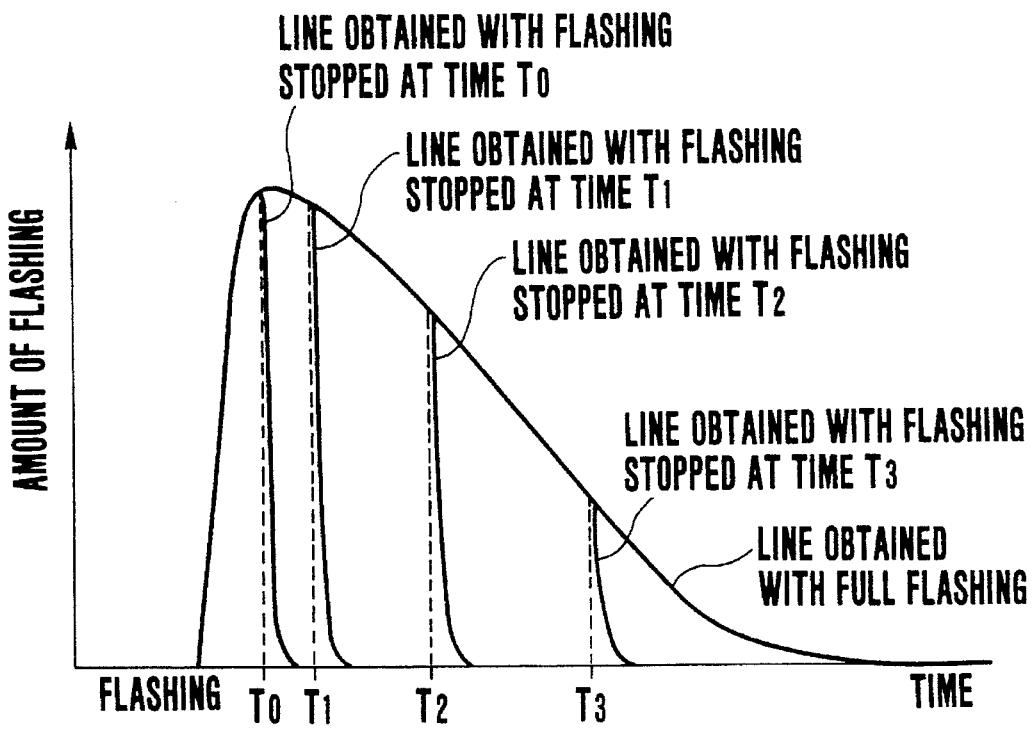
FIG. 4 is a graph showing a relation obtained by the arrangement of FIG. 2 between the amount of flashing controlled by the control means and a period of time between the start and stop of flashing.
Figure 5:
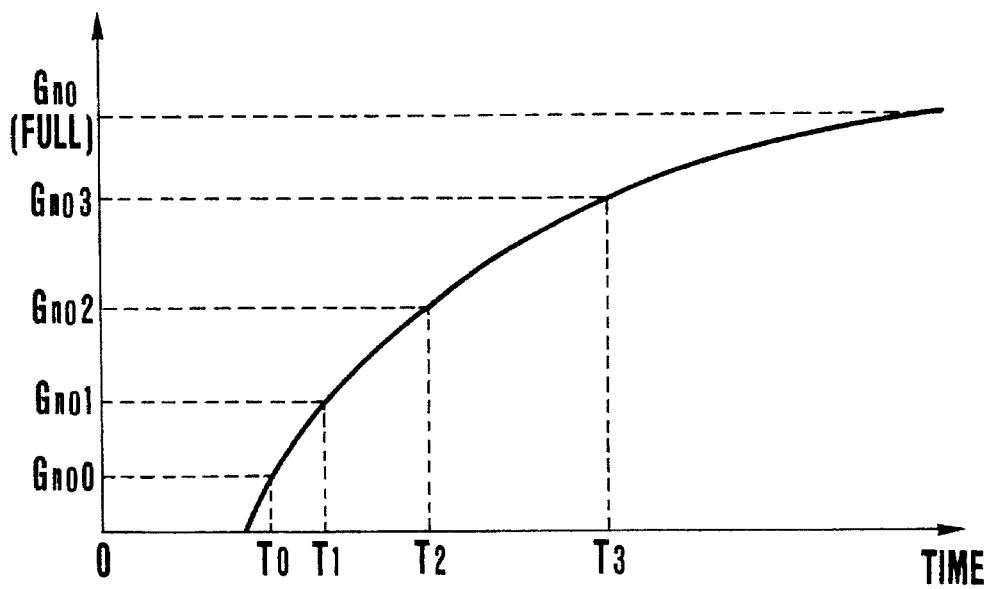
FIG. 5 is a graph showing a flash light guide number (hereinafter referred to as Gno) of the flashing amount control means of FIG. 2 in relation to the period of time between the start and stop of flashing.

FIG. 4 shows the period of time from the start of flashing until the switching element 24 turns off in relation to the amount of flashing. FIG. 5 shows the period of time from the start of flashing until the turning-off of the switching element 24 in relation to the flash light guide number (hereinafter referred to as Gno).

Premature stopping of the flashing, i.e., flash light emission, lowers both the flashing amount and the Gno. The flashing amount and the Gno increase with time.

Figure 6:
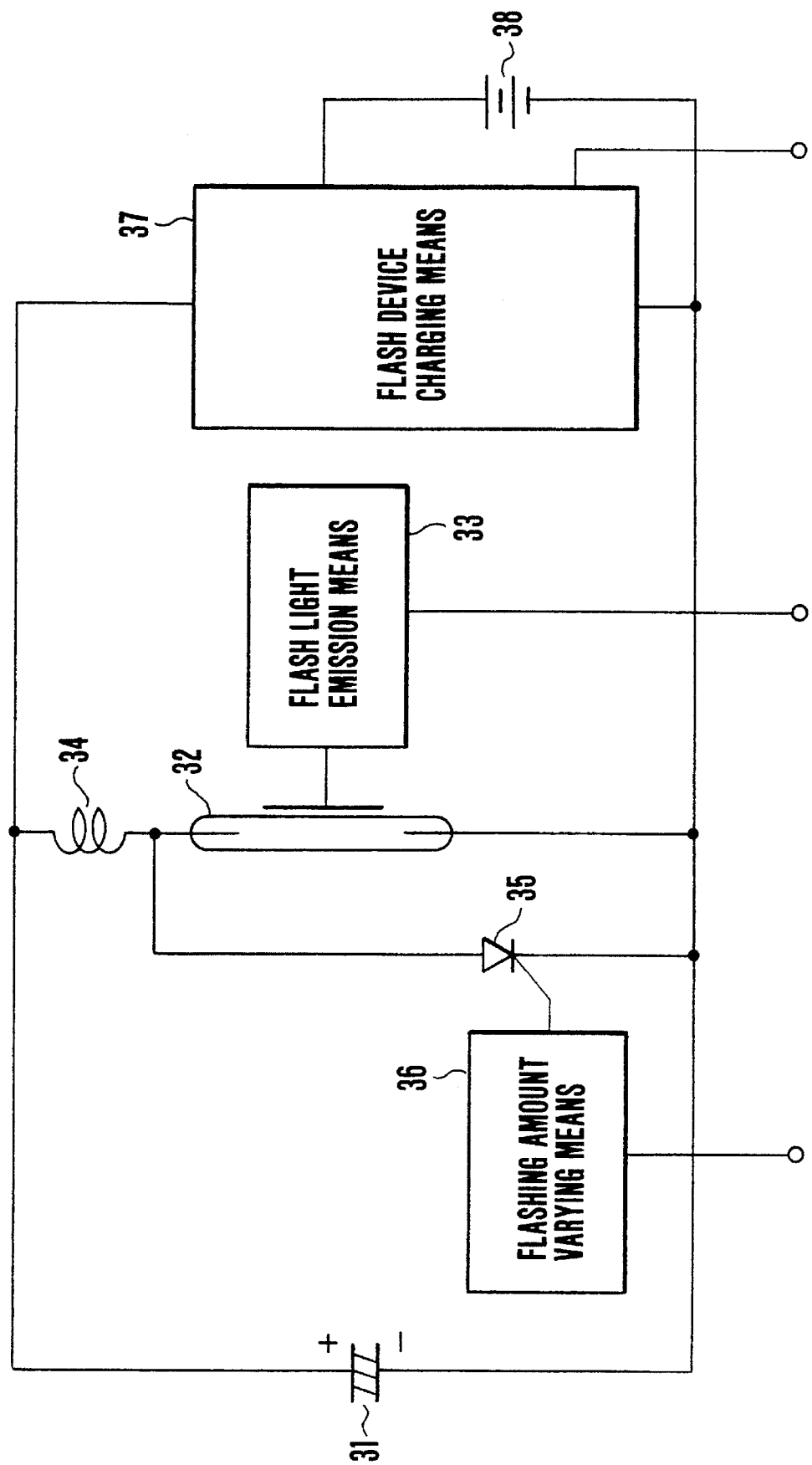
FIG. 6 is a circuit diagram showing the arrangement of another example of flashing amount control means usable for each embodiment of the invention.

FIG. 6 is a circuit diagram showing another example of arrangement of the flashing amount control means 8 which is shown in FIG. 1 and provided for the purpose of varying the amount of flash light emission.

Referring to FIG. 6, a main capacitor 31 is arranged to accumulate energy for flashing by the flash device. A xenon lamp 32 is provided for flashing. Flash light emission means 33 is arranged to cause flashing to begin by exciting the xenon lamp 32. A choke coil 34 is arranged between the xenon lamp 32 and the main capacitor 31 to prevent any sudden change from taking place in a flashing (flash light emission) current. A switching element 35 is arranged to turn on to cut off flashing halfway by bypassing the current of the xenon lamp 32 during the process of flashing. Flashing amount varying means 36 is arranged to vary the amount of flashing by controlling the switching element 35. Flash device charging means 37 is connected to a battery 38 which is a power source. The charging means 37 is thus arranged to boost the voltage of the battery 38 up to a predetermined level and to have its electric charge accumulated at the main capacitor 31.

Figure 7:
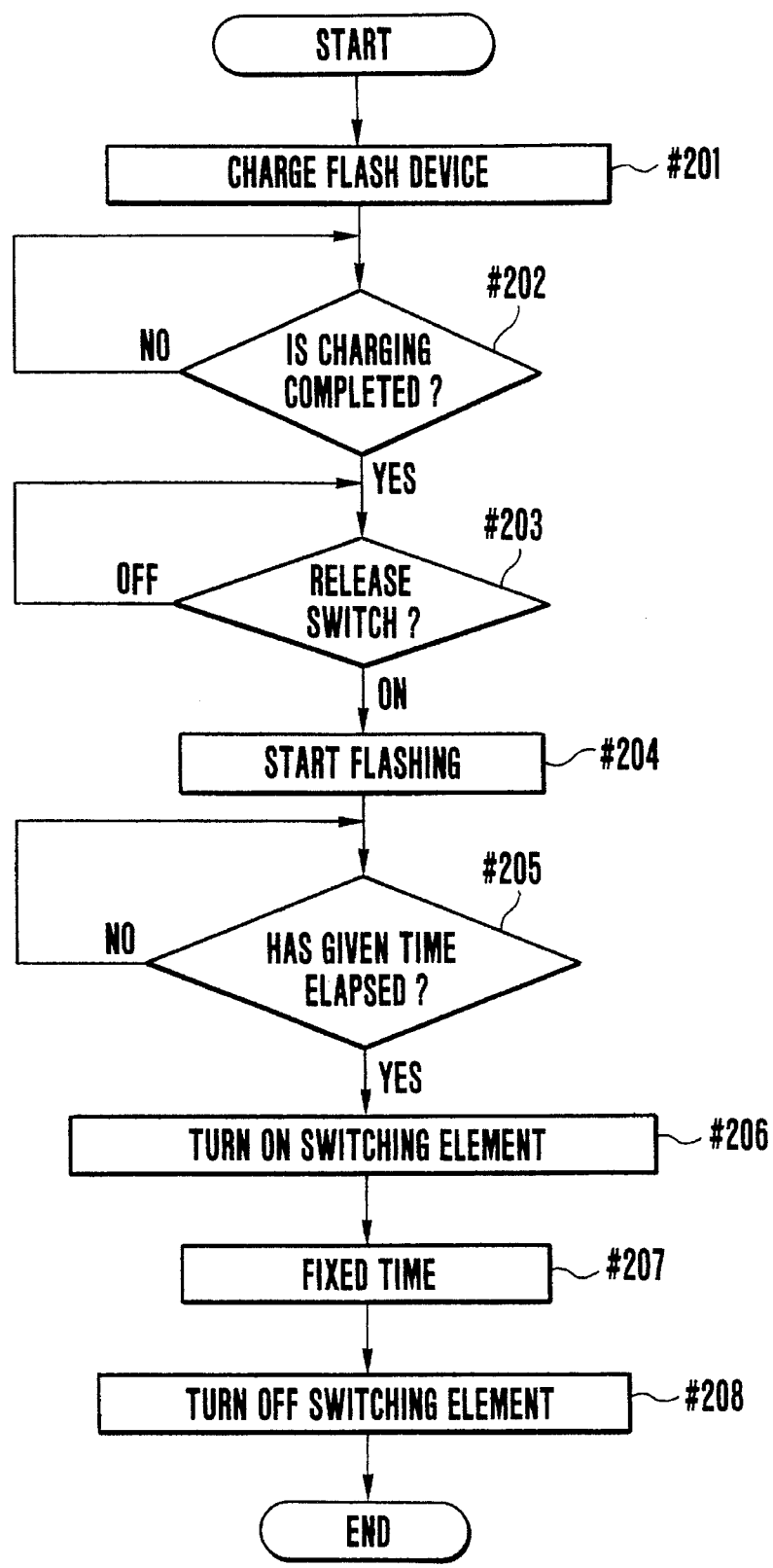
FIG. 7 is a flow chart showing the operation of the flashing amount control means of FIG. 6.

FIG. 7 is a flow chart showing the operation of the flashing amount control means 8 shown in FIG. 6. The operation is described below with reference to FIG. 7:

At a step 201, the flash device charging means 37 is caused to begin charging the main capacitor 31 with a charging start signal inputted from the microprocessor 6 shown in FIG. 1. At a step 202, a check is made to find if the main capacitor 31 has been charged to a given amount. If not, the flow of operation remains at this step. When the main capacitor 31 is charged to the given amount, the flow proceeds to a step 203. At the step 203, a check is made, through a signal coming from the camera body, to find if a shutter release switch which is not shown but is arranged to be turned on by a second stroke of a release button has been turned on. If not, the flow remains at the step 203. When the release switch turns on, the flow proceeds to a step 204.

At the step 204, when the time to flash comes, the flash light emission means 33 outputs a trigger signal to excite the xenon Lamp 32. With the xenon lamp 32 excited, flashing begins. At a step 205, a check is made for the lapse of a given period of time after the start of flashing. If the period of time has not elapsed as yet, the flow remains at the step 205. After the lapse of this period of time, the flow proceeds to a step 206.

At the step 206, the flashing amount varying means 36 turns the switching element 35 on to cut off the flashing by bypassing the flashing current. At a step 207, the flow waits for the lapse of a fixed period of time. At a step 208, the flashing is brought to a stop by turning the switching element 35 off. A flashing amount control action thus comes to an end.

While the operation of the flashing amount control means 8 has been described for each of different arrangements with reference to FIGS. 3 and 7, the possible arrangements of the flashing amount control means are not limited to these examples. The flashing amount control means 8 may be arranged in any other manner as long as the flashing amount is controllable. Other possible arrangements include, for example, an ordinary DC light control type using a commutating capacitor, a type having a plurality of main capacitors and arranged to use them through switch-over means and a type inserting a resistor in between a xenon lamp and a main capacitor and arranged to vary the resistance value of the resistor.

Figure 8:
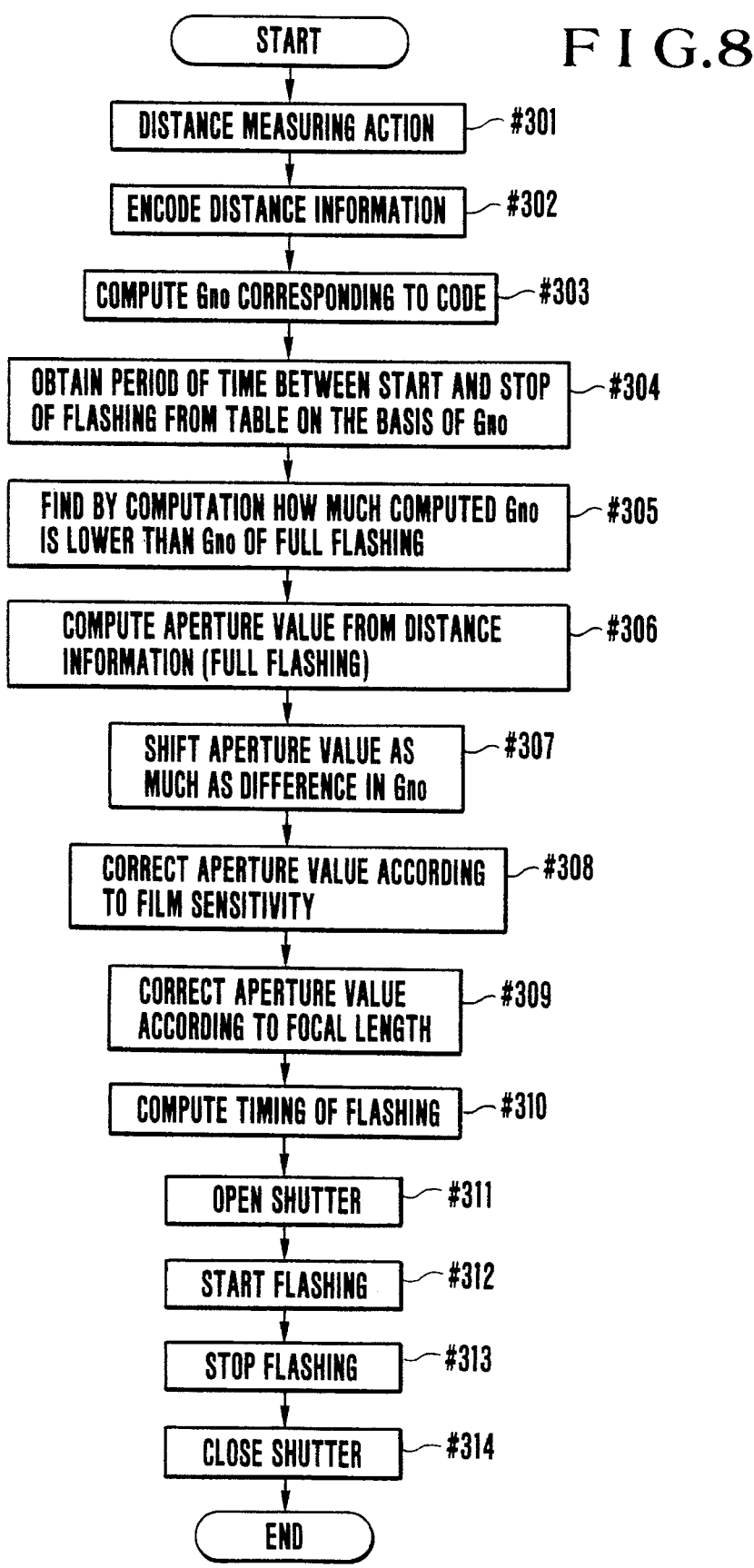
FIG. 8 is a flow chart showing the operation of a camera having a first embodiment of this invention.

FIG. 8 is a flow chart showing the operation of the parts of the camera of FIG. 1 which are related to this invention. The flow of operation is described, with reference also to tables shown in FIGS. 9(*a*), 9(*b*) and 9(*c*) as well as to FIG. 8, as follows:

The microprocessor 6 begins to operate when a release button which is not shown is operated to make its first stroke. At a step 301, the distance measuring device 1 is driven to begin to measure a distance from the camera to an object to be photographed. At a step 302, information on the object distance obtained at the step 301 is encoded by the flashing amount deciding means 5 according to a table stored within the microprocessor 6. The details of the object distance encoding action will be described later herein with reference to FIG. 9(*a*).

At a step 303, the Gno is computed referring to the table of FIG. 9(*b*) on the basis of the distance code obtained at the step 302. At a step 304, a period of time between the start and stop of flashing is obtained referring to the table of FIG. 9(*c*) on the basis of the distance code obtained by the step 302 or on the basis of the Gno obtained by the step 303. At a step 305, the aperture computing means 4 computes and finds how much the value of the Gno obtained at the step 303 is lower than that of the Gno for full flashing. At a step 306, an aperture value apposite to full flashing is computed according to the object distance information obtained from the distance measuring device 1. At a step 307, a reference aperture value is computed by shifting the aperture value obtained at the step 306 as much as a difference in value of the Gno obtained at the step 305.

At a step 308, the aperture value obtained by the step 307 is corrected according to the value of film sensitivity obtained from the film sensitivity detecting means 2. At a step 309, the aperture value obtained by the step 308 is further corrected according to information on the focal length obtained from the lens focal length detecting means 3. An aperture value which is thus obtained is considered to be the final aperture value to be used at the time of flashing (hereinafter this aperture value is referred to as a control aperture value).

At a step 310, a computing operation is carried out to obtain a length of time required from the start of energizing the shutter until immediately before the start of flashing with the aperture adjusted to the control aperture value. At a step 311, the shutter is opened by applying a current actually to the shutter. At a step 312, after the lapse of the time computed by the step 310, i.e., when the aperture is open up to the control aperture value, the flashing is allowed to begin. At a step 313, the flashing is brought to a stop when the flash light quantity reaches the Gno computed by the step 303. At a step 314, the shutter is closed by cutting off the current applied to the shutter after the lapse of a predetermined period of time. An exposure action thus comes to an end.

Referring now to FIGS. 9(a), 9(b) and 9c), the method for computing the length of time between the start and stop of flashing on the basis of information on the measured object distance is described as follows:

In a case where, for example, the information on the object distance obtained from the distance measuring device 1 indicates 12 m, the distance code is set at "4" according to the table of FIG. 9(a). In this instance, the Gno is set at "25" according to the table of FIG. 9(b). The table of FIG. 9(b) is arranged such that the Gno for a flash light quantity to be emitted at the time of full (maximum) flashing is set at "50". The maximum Gno is lowered every 0.25 steps according to the order of the distance codes. Next, the time between the start and stop of flashing is set on the basis of the above-stated distance code or the above-stated Gno according to the table of FIG. 9(c). More specifically, in a case where the object distance is 12 m and the distance code is "4", flashing is decided to be brought to a stop after the lapse of 204 sec from the start of flashing. In this case, therefore, the Gno becomes "25" with the Gno for full flashing being "50".

In a case where the information on the object distance is "7.1 m", the distance code is "7", the Gno is "14.9" and the time between the start and stop of flashing is "156 μsec". If the information on the object distance is "2.1 m", the distance code is "14", the Gno is "4.4" and the time between the start and stop of flashing is "65.2 μsec". The distance codes, the Gno's and the lengths of time between the start and stop of flashing for other object distances are obtained in the same manner.

Figure 10:
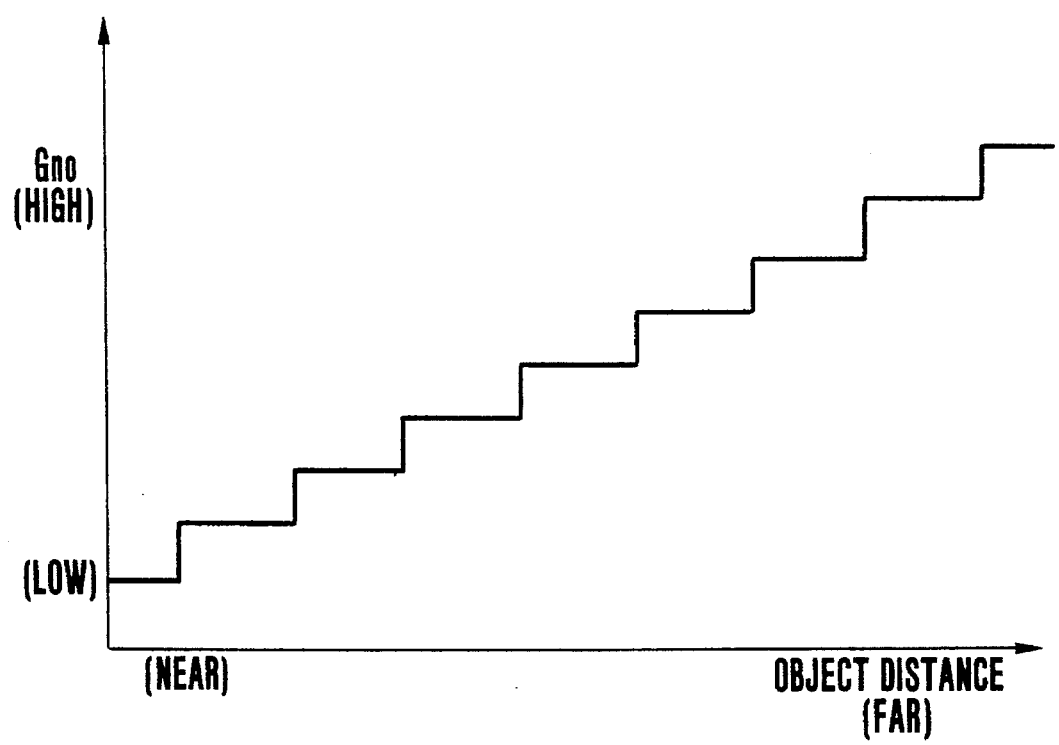
FIG. 10 is a graph showing a relation obtained between the object distance and the flash device Gno in the operation of the camera shown in FIG. 8.

FIG. 10 is a graphical representation of the table of relation between the object distance and the Gno. As shown, the Gno almost linearly becomes lower accordingly as the object distance becomes nearer.

Figure 11:
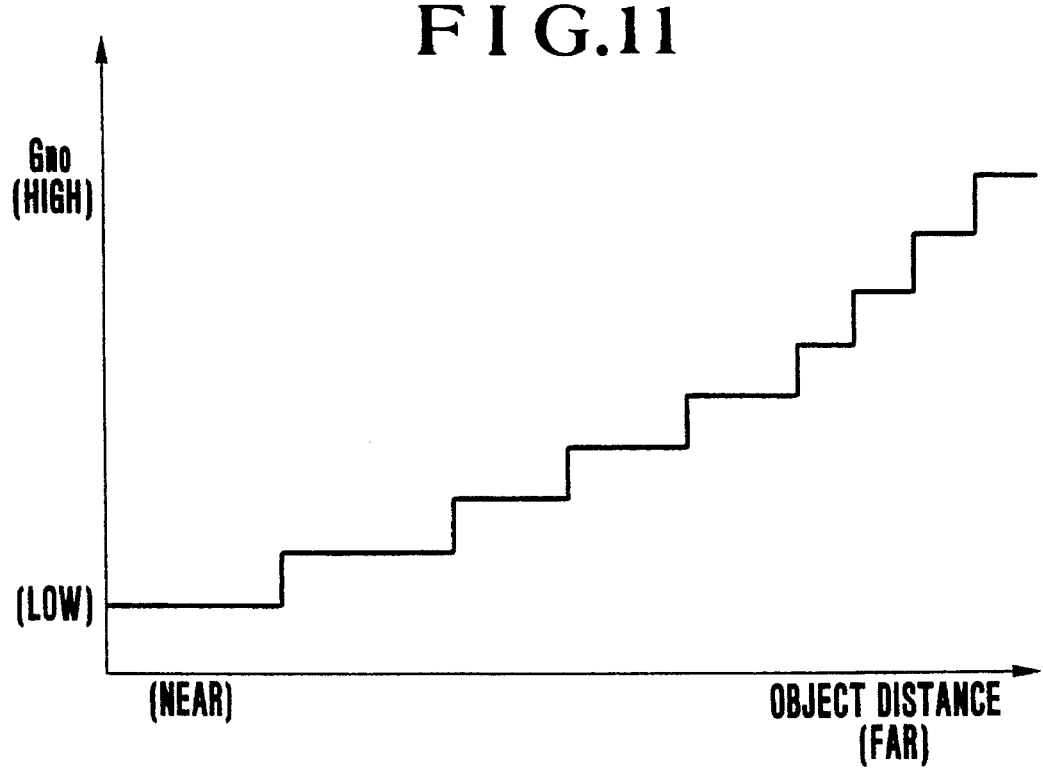
FIG. 11 shows another example of a relation obtained between the object distance and the flash device Gno in the operation of the camera shown in FIG. 8.

FIG. 11 is another graphical representation showing a relation between the object distance and the Gno. In this case, the Gno is lowered to a considerable degree for near object distances and is steeply increased accordingly as the object distance increases. This is feasible by changing the relation of the object distance to the distance code shown in the table of FIG. 9(a).

In accordance with the arrangement of this embodiment, the Gno for any object distance thus can be freely computed by just adjusting the table of relation between the object distance and the distance code.

EMBODIMENT II

Figure 12:
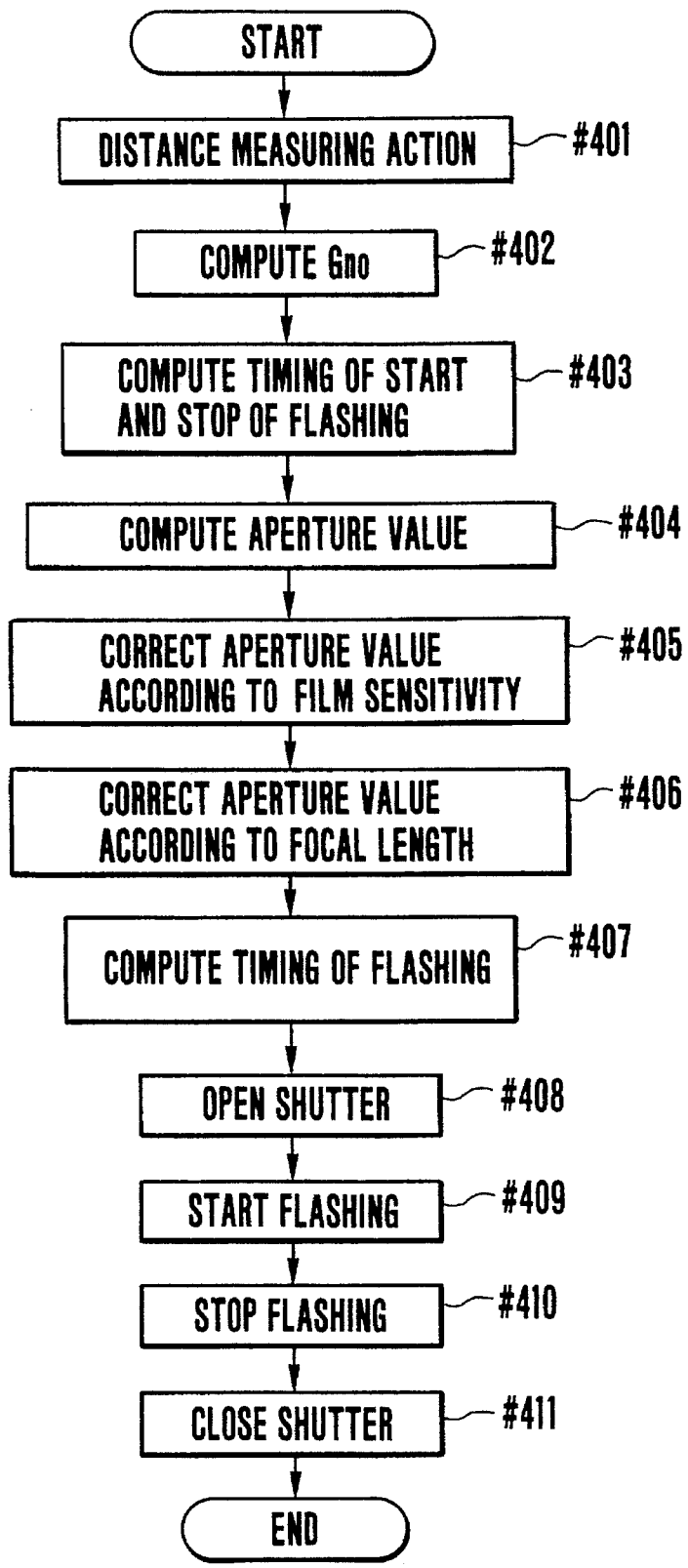
FIG. 12 is a flow chart showing the operation of a camera which is provided with a second embodiment of this invention.

FIG. 12 is a flow chart showing the operation of a camera arranged as a second embodiment of the invention. The circuit arrangement of the camera is similar to the first embodiment shown in FIG. 1. The arrangement of the second embodiment is therefore omitted from description. The flow of operation of the second embodiment is described with reference to FIG. 12 as follows:

At a step 401, the distance measuring device 1 is driven to begin to measure a distance from the camera to an object to be photographed. At a step 402, a Gno is obtained by the flashing amount deciding means 5 through a computing operation, which is performed in a manner as will be described later herein. At a step 403, timing of the start and stop of flashing for the flash light quantity of the Gno obtained by the step 402 is computed. At a step 404, the aperture computing means 4 compute an aperture value apposite to flashing according to the Gno obtained by the step 402.

At a step 405, the aperture value obtained by the step 404 is corrected according to a film sensitivity value input from the film sensitivity detecting means 2. At a step 406, the aperture value obtained by the step 405 is further corrected according to focal length information inputted from the lens focal length detecting means 3. The aperture value corrected in this manner is considered to be the final aperture value (hereinafter referred to as a control aperture value) to be used at the time of flashing. At a step 407, a length of time required from the start of energizing the shutter until immediately before the start of flashing with the aperture adjusted to the control aperture value. At a step 408, a current is actually applied to the shutter to open the shutter. At a step 409, the flashing is allowed to begin after the lapse of the time computed by the step 407. At a step 410, the flashing is brought to a stop after the lapse of the time set by the step 403 from the start of flashing. At a step 411, after the lapse of a predetermined length of time, the current applied to the shutter is cut off to close the shutter. An exposure action comes to an end.

Figure 13:
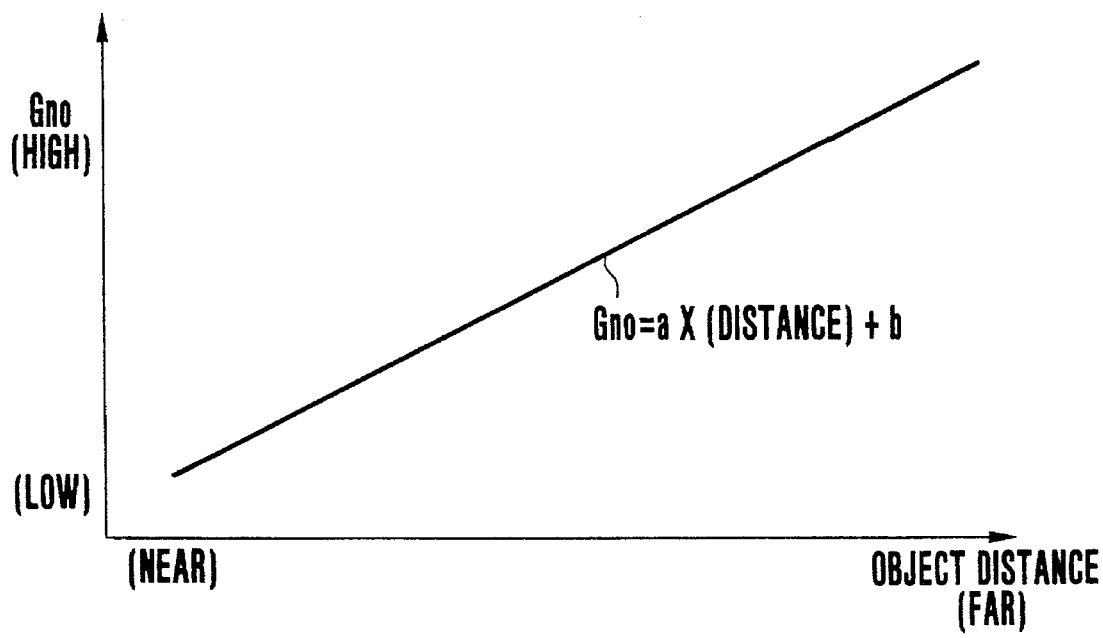
FIG. 13 is a graph showing a relation obtained between the object distance and the flash device Gno in the operation of the camera shown in FIG. 12.

The method for obtaining the Gno by the step 402 from information on the object distance is described below with reference to FIGS. 13 and 14:

Let us assume that a formula for computing the graphical representation of FIG. 13 is inputted to the flashing amount deciding means 5. With the information on the object distance obtained by the step 401, the Gno is obtained according to the following formula:

$$Gno = a \times (distance) + b$$

Assuming that a=1.5 and b=2, if the object distance is 4 m, the Gno can be expressed as "Gno=1.5×2" and thus becomes "8". If the object distance is 1 m, the Gno is expressed as "Gno=1.5×1+2" and is "3.5". In the formula, "a" and "b" are coefficients.

Figure 14:
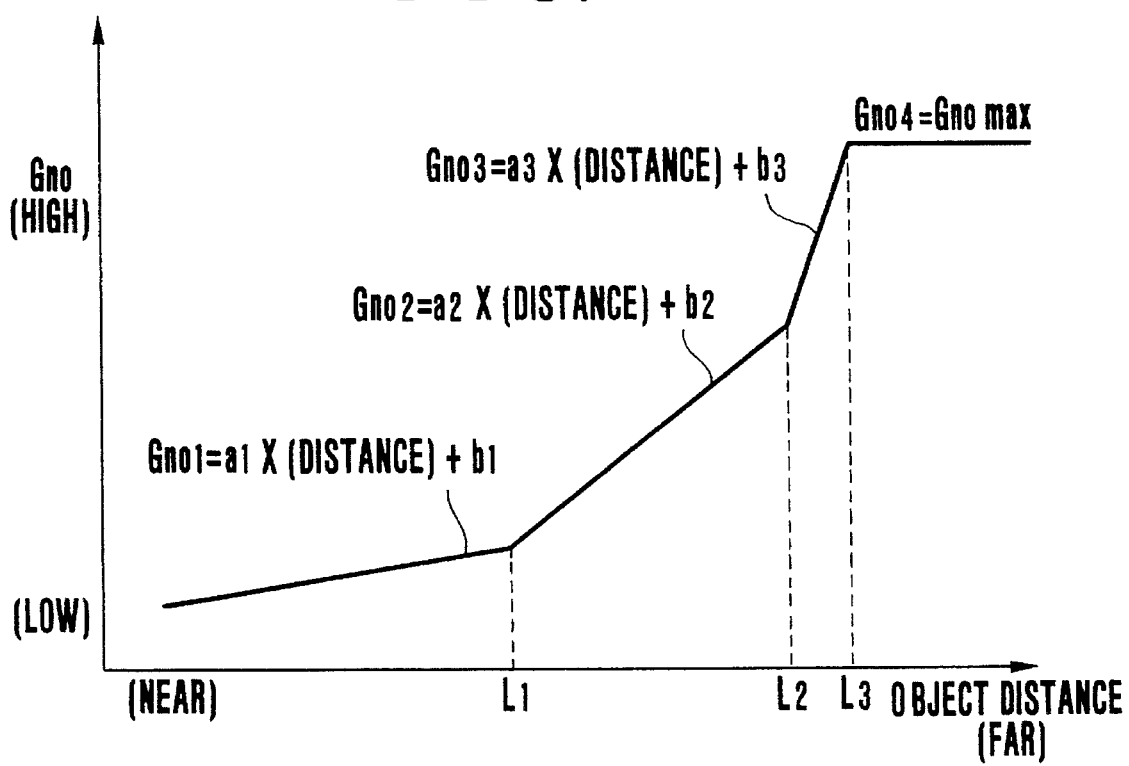
FIG. 14 is a graph showing another relation obtained between the object distance and the flash device Gno in the operation of the camera shown in FIG. 12.

In a case where a formula for computing the graphical representation of FIG. 14 is inputted, the formula varies with the object distance. When the object distance is on a nearer side than a point L1 as shown in FIG. 14, the Gno is computed according to the following formula:

$$Gno = a1 \times (distance) + b1$$

If the object distance is between points L1 and L2 of FIG. 14, the Gno computing formula becomes:

$$Gno = a2X \text{ (distance)} + b2$$

If the object distance is between points L2 and L3 of FIG. 14, the Gno computing formula becomes:

$$Gno = a3X \text{ (distance)} + b3$$

If the object distance is at a point L4 or on a farther side than the point L4, the formula becomes:
Gno=Gno max In these formulas, a1 to a3 are coefficients, which are set in a relation of a1<a2<a3.

The computing formula usable at the step 402 is not limited to these formulas. The Gno is expressed in the form of a linear equation in relation to the object distance. In actuality, however, the same advantageous effect of the embodiment is attainable, without varying the formula according to the object distance like in the case of FIG. 14, by replacing the linear equation with an equation of a higher degree.

Each of the first and second embodiments which have been described above is arranged to decide the Gno on the basis of the object distance information from the distance measuring device arranged within the camera. Therefore, unlike the conventional flash light control device, the invented arrangement obviates the necessity of use of any additional optical system, any additional electric circuit and additional fitting means for flash light control and is thus highly advantageous in terms of space (with the device incorporated into the camera) and cost. It is another advantage that the arrangement suits to recent low-cost cameras having various features as it uses no weak signal and is thus strong against noises.

Further, unlike the conventional flash light control arrangement, the invented arrangement permits taking shots always at a constant apposite value of light quantity on the image plane without being affected by the reflection factor of the object or those of the things existing around the object. A further advantage of the embodiment lies in that, since the Gno can be freely set according to the object distance, the flash light control device is adjustable to meet various requirements. For example, it can be made suitable for taking shots of children without hurting their eyes or taking shots by giving priority to the depth of field.

EMBODIMENT III

A third embodiment of this invention is a flash light control device which is an improvement over the first and second embodiments described in the foregoing. In each of the first and second embodiments, the Gno for a flash light quantity is decided on the basis of object distance information inputted from a distance measuring device and an aperture value is computed in such a way as to attain this Gno at the time of flashing. In actuality, however, it is hardly possible, due to the unevenness of shutter control, a difference in posture, fluctuations in characteristic of parts, etc., to lower the aperture value without limitation while maintaining linearity. In order to stably ensure an adequate aperture value, therefore, it is necessary to set a minimum aperture value. However, in the case of the first and second embodiments, no measures are taken against a case where the aperture value comes to exceed a limit to the action of stably lowering the aperture value. The third embodiment is arranged by way of example to solve this problem.

Figure 15:
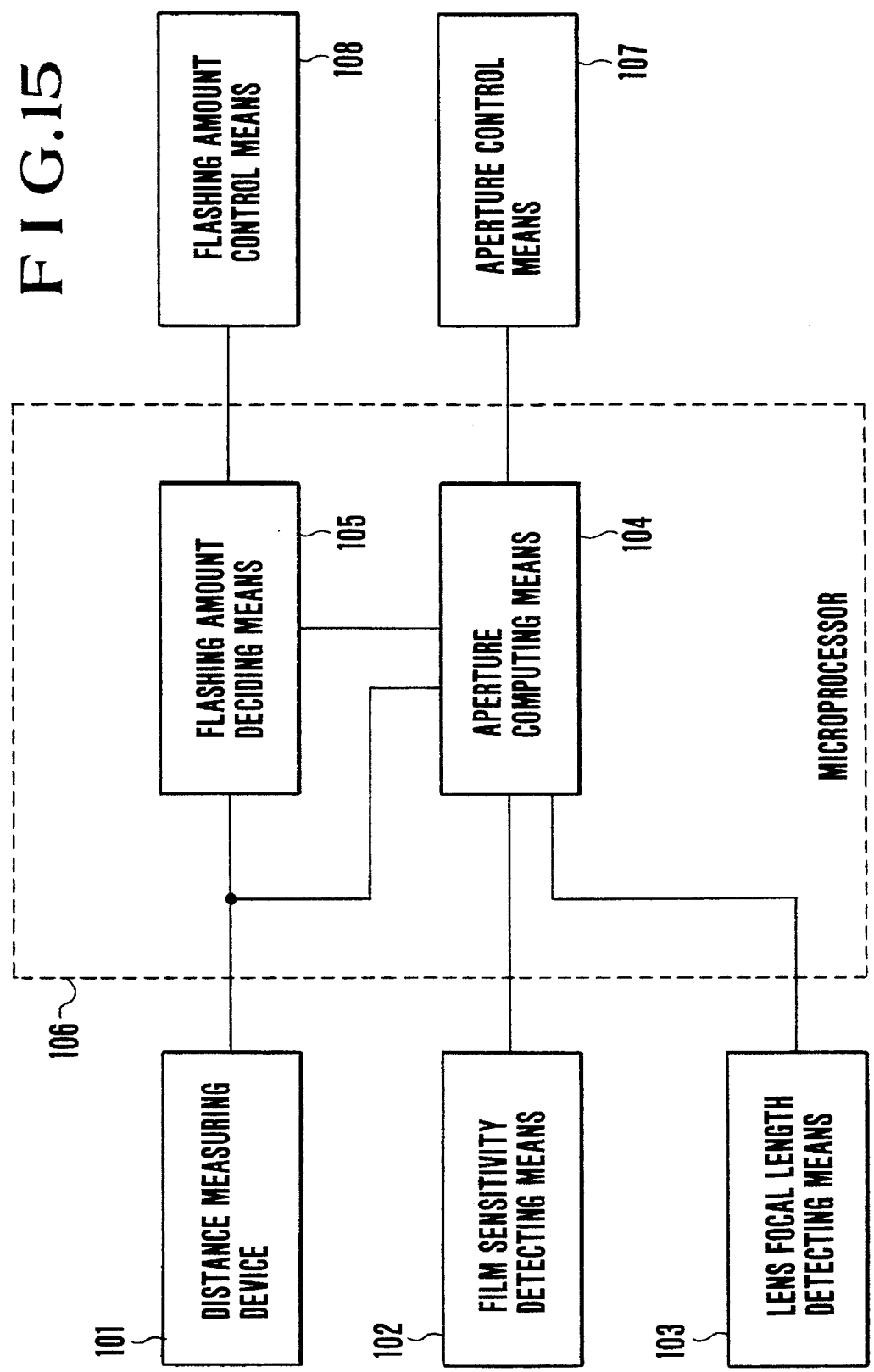
FIG. 15 is a block diagram showing in outline the arrangement of a camera which is provided with a third embodiment of this invention.

FIG. 15 is a block diagram showing the arrangement of a lens-shutter type camera which includes the third embodiment of this invention. Referring to FIG. 15, a known distance measuring device 101 is arranged to measure a distance from the camera to an object to be photographed. Film sensitivity detecting means 102 is arranged to detect the sensitivity of the film from a DX code provided on a film cartridge. Lens focal length detecting means 103 is arranged to detect the focal length of, for example, a zoom lens. Aperture value computing means 104 is arranged to compute an aperture value for flashing on the basis of the Gno computed by flashing amount deciding means 105 and object distance information coming from the distance measuring device 101 and is further arranged to correct the computed aperture value according to the film sensitivity detected and also according to information on the focal length of the lens. The flashing amount deciding means 105 is arranged to decide a Gno according to the object distance information from the distance measuring device 101. A microprocessor 106 includes the above-stated aperture computing means 104 and the flashing amount deciding means 105 and is arranged to perform overall control over the various circuits of the camera and those of the flash light control device. Aperture control means 107 is arranged to control, on the basis of information from the aperture computing means 104, the aperture value to be used for flashing. Flashing amount control means 108 is arranged to control the amount of flashing to make it coincide with a flashing amount set by the flashing amount deciding means 105 and is arranged to include the various circuits of the flash light control device. The circuit arrangement of the flashing amount control means 108 which varies the flashing amount is, for example, as shown in FIG. 2.

Referring to FIG. 2, a main capacitor 21 is arranged to accumulate energy for flashing. A xenon lamp 22 is provided for flashing. Flash light emission means 23 is arranged to excite the xenon lamp 22 for flashing. A switching element 24 is arranged between the xenon lamp 22 and the main capacitor 21 to allow a flashing current to flow or to cut off the current halfway during the process of flashing. Flashing amount varying means 25 is arranged to vary the amount of flash light emission by controlling the switching element 24. Flash device charging means 26 is connected to a battery 27 which is a power source and is arranged to cause the main capacitor 21 to accumulate electric charge by boosting the voltage of the battery 27.

FIG. 3 shows in a flow chart the operation of the flashing amount control means 108 which is arranged as described above with reference to FIG. 2. The flow of operation is described below with reference to FIG. 3:

At a step 101, when a charging start signal is inputted from the microprocessor 106 of FIG. 15, the flash device charging means 26 is excited to begin to charge the main capacitor 21. At a step 102, a check is made to find if the main capacitor 21 has been charged up to a given amount. If not, the flow of operation remains at this step. If so, the flow proceeds to a step 103. At the step 103, a check is made, through a control signal coming from the camera body, to find if a shutter release switch which is not shown but is arranged to be turned on by a second stroke of a release button is in an on-state. If not, the flow remains at the step 103. When the release switch is turned on after that, the flow proceeds to a step 104. At the step 104, a picture taking action begins with the release switch turned on. Following this action, the flashing amount varying means 25 turns the switching element 24 on. At a step 105, when the time to flash comes, the flash light emission means 23 outputs a trigger signal to excite the xenon lamp 22. This causes flashing to begin. At a step 106, a check is made to find if a given period of time has elapsed after commencement of flashing. If not, the flow remains at the step 106. Upon the lapse of this period of time, the flow proceeds to a step 107. At the step 107, the flashing amount varying means 25 causes the switching element 24 to turn off to bring the flashing to a stop. A flashing amount control action thus comes to an end.

FIG. 4 shows the period of time from the start of flashing until the switching element 24 turns off in relation to the amount of flashing. FIG. 5 shows the period of time from the start of flashing until the turning-off of the switching element 24 in relation to the Gno. Premature stopping of the flashing (flash light emission) lowers both the flashing amount and the Gno. The flashing amount and the Gno increase with time.

FIG. 6 is a circuit diagram showing another example of arrangement of the flashing amount control means 108 which is shown in FIG. 15 and is provided for the purpose of varying the amount of flashing.

Referring to FIG. 6, a main capacitor 31 is arranged to accumulate energy for flashing. A xenon lamp 32 is provided for flashing. Flash light emission means 33 is arranged to cause flashing to begin by exciting the xenon lamp 32. A choke coil 34 is arranged between the xenon lamp 32 and the main capacitor 31 to prevent any sudden change from taking place in a flashing current. A switching element 35 is arranged to turn on to cut off flashing halfway by bypassing the current of the xenon lamp 32 during the process of flashing. Flashing amount varying means 36 is arranged to vary the amount of flashing by controlling the switching element 35. Flash device charging means 37 is connected to a battery 38 which is a power source. The charging means 37 is thus arranged to boost the voltage of the battery 38 up to a predetermined level and to have its electric charge accumulated at the main capacitor 31.

FIG. 7 is a flow chart showing the operation of the flashing amount control means 108 shown in FIG. 6. The operation is described below with reference to FIG. 7:

At a step 201, the flash device charging means 37 is caused to begin charging the main capacitor 31 with a charging start signal inputted from the microprocessor 106 shown in FIG. 15. At a step 202, a check is made to find if the main capacitor 31 has been charged to a given amount. If not, the flow of operation remains at this step. When the main capacitor 31 is charged to the given amount, the flow proceeds to a step 203. At the step 203, a check is made, through a signal coming from the camera body, to find if a shutter release switch which is not shown but is arranged to be turned on by a second stroke of a release button has been turned on. If not, the flow remains at the step 203. When the release switch turns on, the flow proceeds to a step 204.

At the step 204, when the time to flash comes, the flash light emission means 33 outputs a trigger signal to excite the xenon lamp 32. With the xenon lamp 32 excited, flashing begins. At a step 205, a check is made for the lapse of a given period of time after the start of flashing. If the period of time has not elapsed as yet, the flow remains at the step 205. After the lapse of this period of time, the flow proceeds to a step 206.

At the step 206, the flashing amount varying means 36 turns the switching element 35 on to cut off the flashing by bypassing the flashing current. At a step 207, the flow waits for the lapse of a fixed period of time. At a step 208, the flashing is brought to a stop by turning the switching element 35 off. A flashing amount control action thus comes to an end.

While the operation of the flashing amount control means 108 has been described for each of different arrangements with reference to the flow charts of FIGS. 3 and 7, the possible arrangements of the flashing amount control means are not limited to these examples described.

The flashing amount control means 108 may be arranged in any other manner as long as the flashing amount is controllable. Other possible arrangements include, for example, an ordinary DC light control type using a commutation capacitor, a type having a plurality of main capacitors and arranged to use them through switch-over means and a type inserting a resistor in between a xenon lamp and a main capacitor and arranged to vary the resistance value of the resistor.

Figure 16:
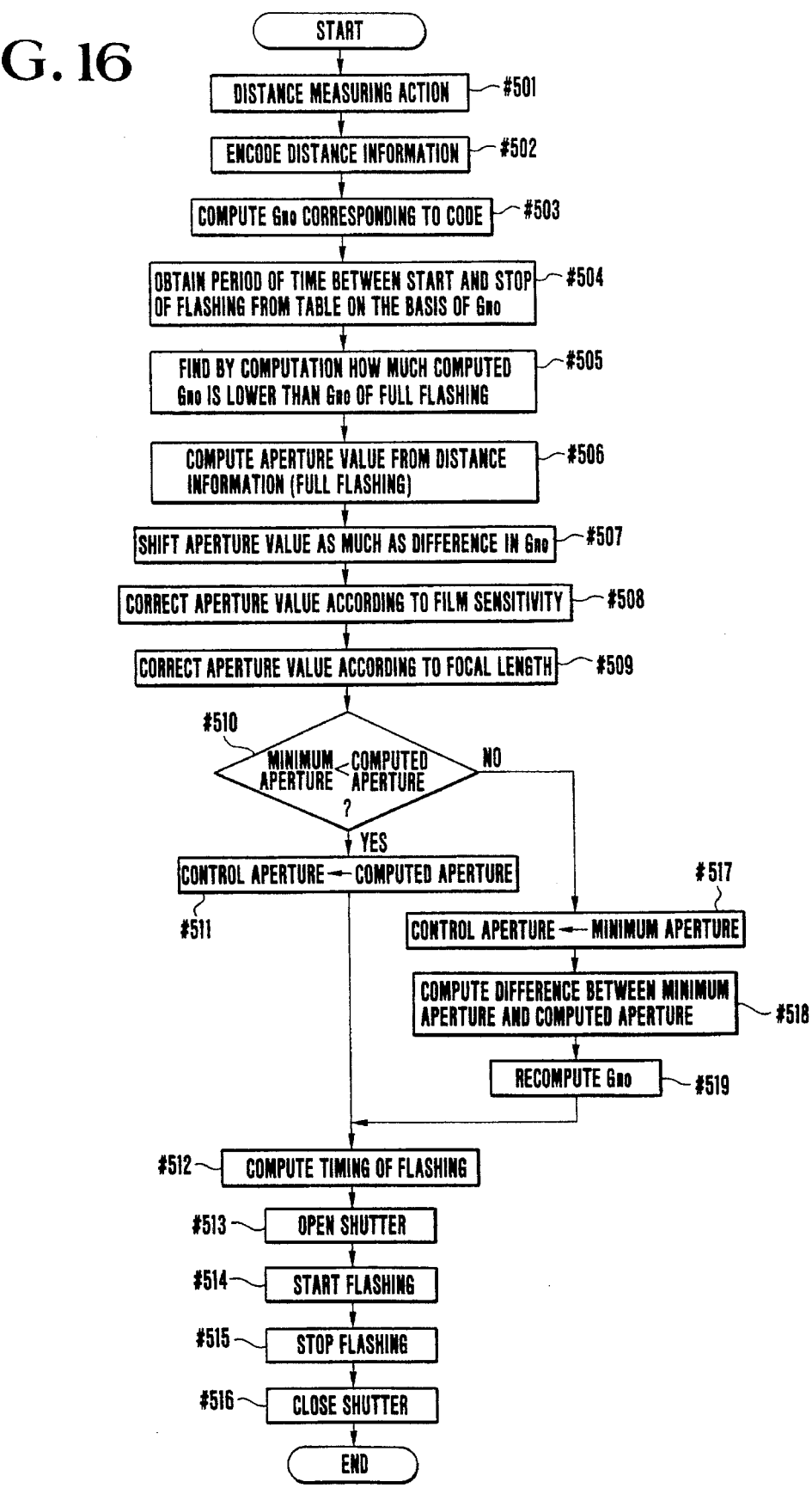
FIG. 16 is a flow chart showing the operation of the camera of FIG. 15.

FIG. 16 is a flow chart showing the operation of the parts of the camera of FIG. 15 which are related to this invention. The flow of operation is described, with reference also to tables shown in FIGS. 17(*a*), 17(*b*) and 17(*c*) as well as to FIG. 16, as follows:

The microprocessor 106 begins to operate from a step 501 when a release button which is not shown is operated to make its first stroke. At the step 501, the distance measuring device 101 is driven to begin to measure a distance from the camera to an object to be photographed. At a step 502, information on the object distance obtained at the step 301 is encoded by the flashing amount deciding means 105 according to a table stored within the microprocessor 106. The details of the distance encoding action will be described later herein with reference to FIG. 17(*a*).

At a step 503, the Gno is computed referring to the table of FIG. 17(*b*) on the basis of the distance code obtained at the step 502. At a step 504, a period of time between the start and stop of flashing is obtained referring to the table of FIG. 17(*c*) on the basis of the distance code obtained by the step 502 or the Gno obtained by the step 503. At a step 505, the aperture computing means 104 computes and finds how much the value of the Gno is lower than that of the Gno for full flashing. At a step 506, an aperture value apposite to full flashing is computed according to the object distance information from the distance measuring device 101. At a step 507, a reference aperture value is computed by shifting the aperture value obtained at the step 506 as much as a difference of the Gno obtained at the step 505.

At a step 508, the aperture value obtained by the step 507 is corrected according to the value of film sensitivity obtained from the film sensitivity detecting means 102. At a step 509, the aperture value obtained by the step 508 is further corrected according to information on the focal length obtained from the lens focal length detecting means 103. An aperture value which is thus obtained is hereinafter called a computed aperture value.

At a step 510, a check is made to find if the computed aperture value obtained by the step 509 is larger than a minimum aperture value. If so, the flow proceeds to a step 511. If the computed aperture value is found to be smaller than the minimum aperture value, the flow comes to a step 517. At the step 511, the computed aperture value is considered to be the final aperture value to be used at the time of flashing (hereinafter this aperture value is referred to as a control aperture value). At a step 512, a computing operation is carried out to obtain a length of time required from the start of energizing the shutter until immediately before the start of flashing with the aperture adjusted to the control aperture value. At a step 513, the shutter is opened by applying a current actually to the shutter. At a step 514, after the lapse of the time computed by the step 512, the flashing is allowed to begin. At a step 515, the flashing is brought to a stop when the time decided by the step 504 elapses after the start of flashing. At a step 516, the shutter is closed by cutting off the current applied to the shutter after the lapse of a predetermined period of time. An exposure action thus comes to an end.

As mentioned above, if the computed aperture value obtained by the step 509 is found to be smaller than the minimum aperture value at the step 510, the flow comes to the step 517. At the step 517, the minimum aperture value is decided to be the control aperture value, because it is impossible to have any aperture value smaller than the minimum aperture value. At a step 518, a difference between the minimum aperture value and the computed aperture value is computed. At a step 519, a Gno value corresponding to the difference obtained by the step 518 is subtracted from the Gno obtained by the step 503. The flow then comes to the above-stated step 512 for the processes to be performed thereafter.

Referring to FIGS. 17(a), 17(b) and 17(c), the method for computing the length of time between the start and stop of flashing on the basis of information on the measured object distance is described as follows:

In a case where, for example, the object distance information obtained from the distance measuring device 101 indicates 8.8 m, the distance code is set at "4" according to the table of FIG. 17(a). In this instance, the Gno is set at "25" according to the table of FIG. 17(b). The table of FIG. 17(b) is arranged such that the Gno for full flashing is set at "50". This Gno is lowered every 0.25 steps according to the order of the distance codes. Next, the time between the start and stop of flashing is set on the basis of the above-stated distance code (or the Gno) according to the table of FIG. 17(c). The aperture value is obtained with reference to FIG. 18. If the distance code is "4", the aperture value is first set at "F 2.83" according to the table of FIG. 18. After that, the aperture value is corrected according to the ISO value of film sensitivity and also according to the result of zooming. For example, the aperture value is not corrected and remains at "F 2.83" if the ISO value is "100" and the zoom lens is in its wide-angle end position. The timing for starting and stopping the flashing is arranged as follows: In a case where the object distance is 8.8 m and the distance code is "4", the Gno which is at "50" for full flashing becomes "25" if the flashing is brought to a stop 204 μsec after the start of flashing.

In a case where the object distance is 4.1 m, the distance code is "7" and the Gno is "14.9". In this case, the aperture value is "F 3.67" with the ISO value at "100" and the lens in the wide-angle end position, and the time between the start and stop of flashing is 156 μsec. If the object distance is 0.65 m, the distance code is "14", the Gno is "4.4", the aperture value is "F 6.37" with the ISO value at "100" and the lens at the wide-angle end, and the time between the start and stop of flashing is 65.2 μsec. Other distance codes, the Gno values and the time between the start and stop of flashing are also obtainable from the object distances in the same manner.

If the object distance is 0.23 m, the distance code becomes "18" and the aperture value "F 9.5". In this case, however, if the ISO value is changed from "100" to "1600" to increase the film sensitivity by four steps, the aperture value increases from "F 9.51" to "F 38.28" to exceed a set minimum aperture value "F 32.00". In that instance, the Gno must be lowered as much as a difference between the aperture values "F 32.00" and "F 38.28", i.e., by 0.5 step. The Gno is at "2.21" for the distance code of "18". Therefore, with the Gno shifted by 0.5 step, it becomes "1.56". The time between the start and stop of flashing for this Gno is computed to be 41.2 μsec.

According to this third embodiment, a Gno is decided on the basis of the measured distance information and an aperture value is computed accordingly. However, after arrival of the aperture value to the minimum aperture value which is the stably lowerable (toward a smaller stop) limit to the aperture value, the Gno is lowered as much as a difference between the necessary aperture value and the minimum aperture value. Therefore, it becomes possible to give apposite flashing amounts over a wide range without being affected by the fluctuations of various things incidental to shutter control.

EMBODIMENT IV

Figure 19:
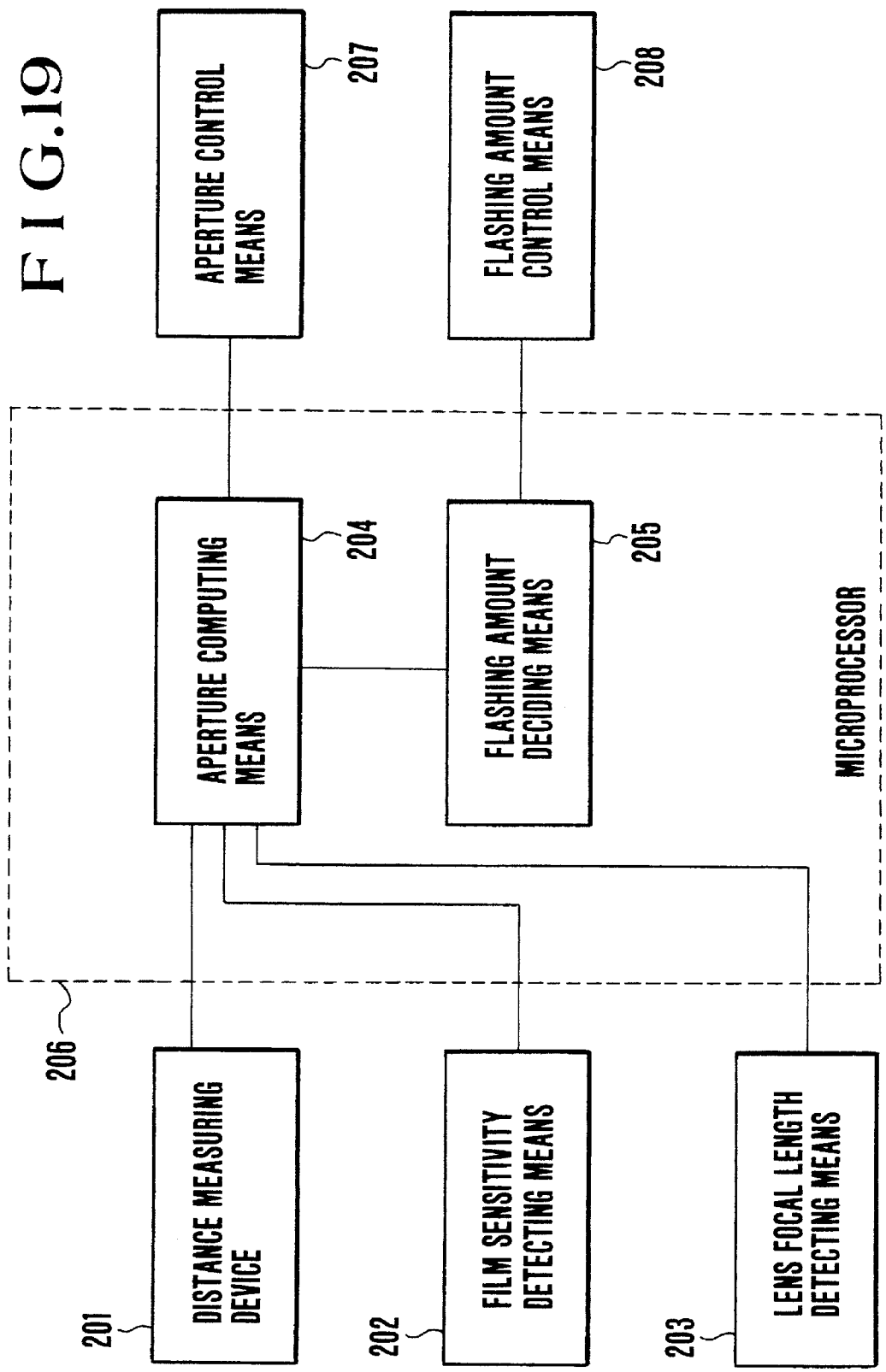
FIG. 19 is a block diagram showing in outline the arrangement of a camera which is provided with a fourth embodiment of this invention.

A fourth embodiment of the invention is arranged in a different manner from the first and second embodiments for attaining the same advantageous effects. The arrangement of the fourth embodiment is described below with reference to FIG. 19, which shows in a block diagram the essential parts of a lens-shutter type camera including the fourth embodiment of the invention:

Referring to FIG. 19, a known distance measuring device 201 is arranged to measure a distance from the camera to an object to be photographed. Film sensitivity detecting means 202 is arranged to detect the sensitivity of a film in use from a DX code provided on the surface of a film cartridge. Lens focal length detecting means 203 is arranged to detect the focal length of a lens which is, for example, a zoom lens. Aperture computing means 204 is arranged to compute an aperture value to be used at the time of flashing on the basis of information on the object distance obtained from the distance measuring device 201 and further to correct the aperture value according to the film sensitivity detected and the focal length of the lens detected. The aperture computing means 204 is thus arranged to give information on a deficiency or an excess of light quantity relative to a preset aperture value to flashing amount deciding means 205. The flashing amount deciding means 205 is arranged to compute a flash light quantity to be emitted in such a way as to correct the deficiency or excess relative to the preset aperture value according to the information from the aperture computing means 204. A microprocessor 206 includes the above-stated aperture computing means 204 and the flashing amount deciding means 205 and is arranged to perform overall control over the various circuits of the camera and those of the flash light control device. Aperture control means 207 is arranged to control the aperture value to be used at the time of flashing on the basis of information from the aperture computing means 204. Flashing amount control means 208 includes the various circuits of the flash light control device and is arranged to control and vary the amount of flashing to make it coincide with a flashing amount set by the flashing amount deciding means 205.

FIG. 2 shows in a circuit diagram an example of arrangement of the flashing amount control means 208 for varying the amount of flash light emission. Referring to FIG. 2, a main capacitor 21 is arranged to accumulate energy for flashing. A xenon lamp 22 is provided for flash light emission. Flash light emission means 23 is arranged to cause flashing by exciting the xenon lamp 22. A switching element 24 is arranged between the xenon lamp 22 and the main capacitor 21 to cause a flashing current to flow or to be cut off halfway during the process of flashing. Flashing amount varying means 25 is arranged to vary the flashing amount by controlling the switching element 24. Flash device charging means 26 is connected to a battery 27 which is a power source and is thus arranged to boost the voltage of the battery 27 up to a given level and to have the electric charge of it accumulated by the main capacitor 21.

FIG. 3 shows in a flow chart the operation of the flashing amount control means 208 which is arranged as described above with reference to FIG. 2. The flow of operation of the flashing amount control means 208 is described below with reference to FIG. 3:

At a step 101, when a charging start signal is inputted from the microprocessor 206 of FIG. 19, the flash device charging means 26 is caused to begin to charge the main capacitor 21. At a step 102, a check is made to find if the main capacitor 21 has been charged up to the given amount. If not, the flow of operation remains at this step. If so, the flow proceeds to a step 103. At the step 103, a check is made, through a control signal coming from the camera body, to find if a shutter release switch which is not shown but is arranged to be turned on by a second stroke of a release button is in an on-state. If not, the flow remains at the step 103. When the release switch is turned on after that, the flow proceeds to a step 104. At the step 104, a picture taking action begins with the release switch turned on. Following this action, the flashing amount varying means 25 turns the switching element 24 on. At a step 105, when the time to flash comes, the flash light emission means 23 outputs a trigger signal to excite the xenon lamp 22. This causes flashing to begin. At a step 106, a check is made to find if a given period of time has elapsed after commencement of flashing. If not, the flow remains at the step 106. Upon the lapse of this period of time, the flow proceeds to a step 107. At the step 107, the flashing amount varying means 25 causes the switching element 24 to turn off to bring the flashing to a stop. A flashing amount control action thus comes to an end.

FIG. 4 shows the period of time from the start of flashing until the switching element 24 turns off in relation to the amount of flashing. FIG. 5 shows the period of time from the start of flashing until the turning-off of the switching element 24 in relation to the Gno (flash light guide number). Premature stopping of the flashing lowers both the flashing amount and the Gno. The flashing amount and the Gno increase with time.

FIG. 6 is a circuit diagram showing another example of arrangement of the flashing amount control means 208 which is shown in FIG. 19 and is provided for varying the amount of flash light emission.

Referring to FIG. 6, a main capacitor 31 is arranged to accumulate energy for flashing by the flash device. A xenon lamp 32 is provided for flashing. Flash light emission means 33 is arranged to cause flashing to begin by exciting the xenon lamp 32. A choke coil 34 is arranged between the xenon lamp 32 and the main capacitor 31 to prevent any sudden change from taking place in a flashing current. A switching element 35 is arranged to turn on to cut off flashing halfway by bypassing the current of the xenon lamp 32 during the process of flashing. Flashing amount varying means 36 is arranged to vary the amount of flashing by controlling the switching element 35. Flash device charging means 37 is connected to a battery 38 which is a power source. The charging means 37 is thus arranged to boost the voltage of the battery 38 up to a predetermined level and to have its electric charge accumulated at the main capacitor 31.

FIG. 7 is a flow chart showing the operation of the flashing amount control means 208 shown in FIG. 6. The operation is described below with reference to FIG. 7:

At a step 201, the flash device charging means 37 is caused to begin charging the main capacitor 31 with a charging start signal inputted from the microprocessor 206 shown in FIG. 19. At a step 202, a check is made to find if the main capacitor 31 has been changed to a given amount. If not, the flow of operation remains at this step. When the main capacitor 31 is charged to the given amount, the flow proceeds to a step 203. At the step 203, a check is made, through a signal coming from the camera body, to find if a shutter release switch which is not shown but is arranged to be turned on by a second stroke of a release button has been turned on. If not, the flow remains at the step 203. When the release switch turns on, the flow proceeds to a step 204. At the step 204, when the time to flash comes, the flash light emission means 33 outputs a trigger signal to excite the xenon lamp 32. With the xenon lamp 32 excited, flashing begins. At a step 205, a check is made for the lapse of a given period of time after the start of flashing. If the period of time has not elapsed as yet, the flow remains at the step 205. After the lapse of this period of time, the flow proceeds to a step 206.

At the step 206, the flashing amount varying means 36 turns the switching element 35 on to cut off the flashing by bypassing the flashing current. At a step 207, the flow waits for the lapse of a fixed period of time before it comes to a step 208. At the step 208, the flashing is brought to a stop by turning the switching element 35 off. A flashing amount control action thus comes to an end.

While the operation of the flashing amount control means 208 has been described for each of different examples of arrangement with reference to FIGS. 3 and 7, the possible arrangements of the flashing amount control means are not limited to these examples. The flashing amount control means 208 may be arranged in any other manner as long as the flashing amount is controllable. Other possible arrangements include, for example, an ordinary DC light control type using a commutating capacitor, a type having a plurality of main capacitors and arranged to use them through switch-over means and a type inserting a resistor in between a xenon lamp and a main capacitor and arranged to vary the resistance value of the resistor.

Figure 20:
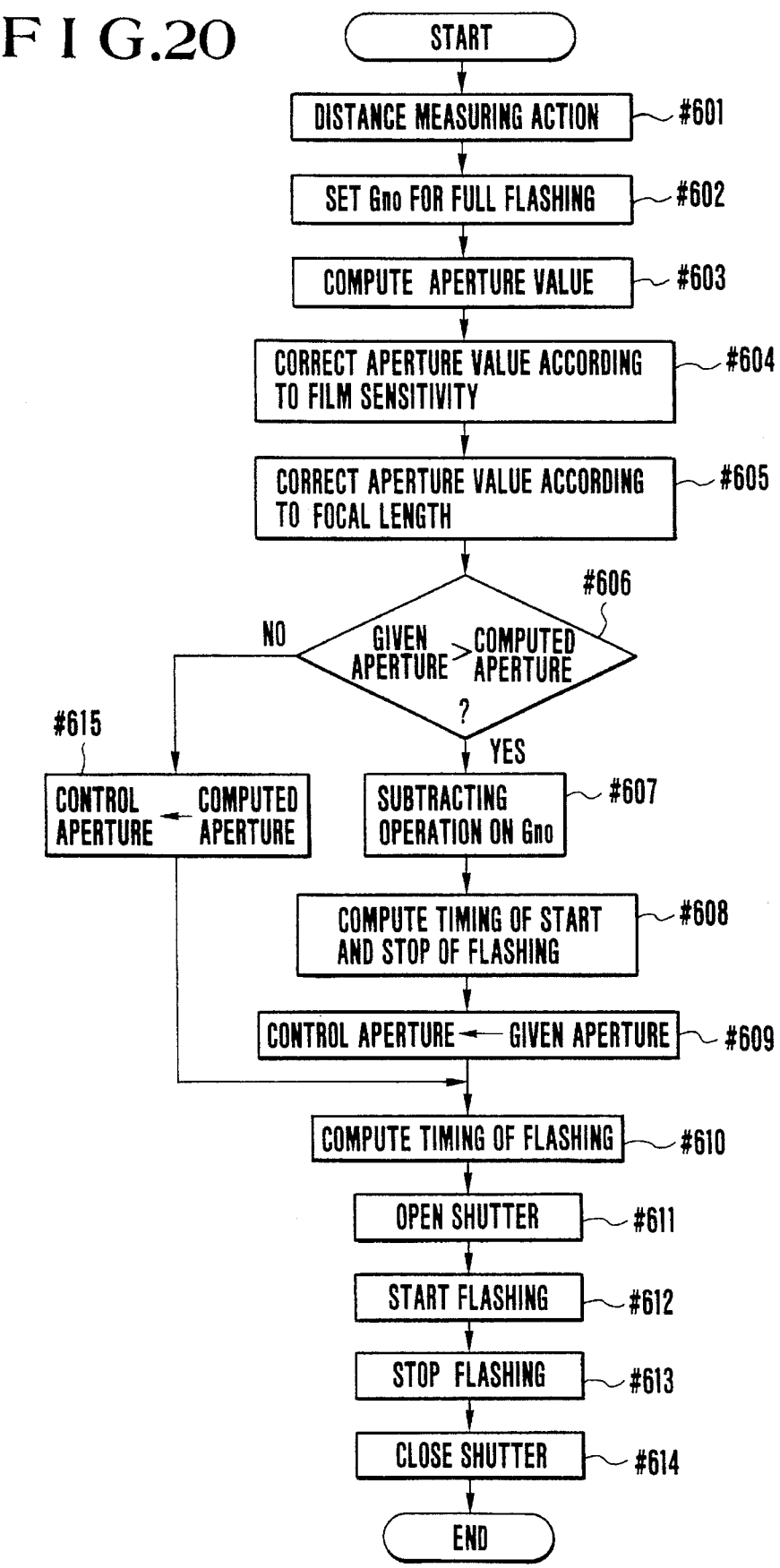
FIG. 20 is a flow chart showing the operation of the camera of FIG. 19.

FIG. 20 is a flow chart showing the operation of the parts of the camera of FIG. 19 which are related to this invention. The flow of operation is described with reference to FIG. 19 as follows:

The microprocessor 206 begins to operate when a release button which is not shown is operated to make its first stroke. At a step 601, the distance measuring device 201 is driven to begin to measure a distance from the camera to an object to be photographed. At a step 602, a Gno which applies to full flashing and is stored beforehand is read out and set. At a step 603, the aperture computing means 204 computes an aperture value to be used at the time of flashing on the basis of the object distance obtained by the step 601 and the full flashing Gno obtained by the step 602. At a step 604, in relation to a distance code obtained by the step 602 (or the Gno obtained by the step 603), a correction is made according to the film sensitivity information obtained from the film sensitivity detecting means 202. At a step 605, an aperture value obtained by the step 604 is further corrected according to information on the focal length obtained from the lens focal length detecting means 203. At a step 606, a preset aperture value set by the flashing amount deciding means 205 is compared with a computed aperture value which is obtained at the step 605 by the aperture computing means 204. If the computed aperture value is found to be smaller than the preset aperture value, the flow proceeds to a step 607. If the former is found to be larger than the latter, the flow comes to a step 615. At the step 607, a value of Gno corresponding to a difference between the computed aperture value and the preset aperture value is subtracted from the Gno for full flashing. The result of subtraction is then considered to be the Gno to be used in taking a picture. At a step 608, the flashing amount deciding means 205 computes a length of time between (or timing for) the start and stop of flashing by which the Gno obtained by the step 607 is attainable. At a step 609, since the computed aperture value is smaller than the preset aperture value in this case, an aperture value at which the flash light is allowed to be actually emitted (hereinafter referred to as control aperture value) is changed to the above-stated preset aperture value.

At a step 610, a length of time from the start of a shutter energizing process until immediately before the start of flashing during which the aperture reaches the control aperture value is computed. At a step 611, the shutter is opened by applying a current actually to the shutter. At a step 612, after the lapse of the time computed by the step 610, i.e., when the aperture reaches the position of the control aperture value, the flashing is allowed to begin. At a step 613, the flashing is brought to a stop upon the lapse of the time decided by the step 608 after the start of flashing. At a step 614, the shutter is closed by cutting off the current applied to the shutter after the lapse of a predetermined period of time. An exposure action thus comes to an end.

If the computed aperture value is found to be larger than the preset aperture value at the step 606, the flow comes to a step 615. At the step 615, the control aperture value to be used at the time of actual flashing is set at the computed aperture value. The flow comes to the step 610 for the processes to be executed thereafter.

The following describes the relation of the object distance to the aperture value with reference to FIG. 21 and the relation of the object distance to the Gno with reference to FIG. 22.

In a case where the object distance obtained at the step 601 of FIG. 20 is farther than a distance point L4 shown in FIGS. 21 and 22, the computed aperture value becomes a maximum aperture value (AVmax), which is naturally larger than the preset aperture value (AV1). In this instance, the control aperture value becomes the computed aperture value, i.e., the maximum aperture value AVmax, and the Gno is set at a value for full flashing.

If the object distance is between distance points L4 and L3, the computed aperture value is larger than the preset aperture value AV1. Therefore, the control aperture value becomes the computed aperture value and the Gno is for full flashing also in this case. If the object distance is nearer than the distance point L3, the computed aperture value is smaller than the preset aperture value AV1. In that case, the control aperture value is set at the preset aperture value AV1 and the Gno is adjusted to a flashing amount which is obtained by lowering a full flashing light quantity as much as a difference between the preset aperture value and the computed aperture value.

EMBODIMENT V

Figure 23:
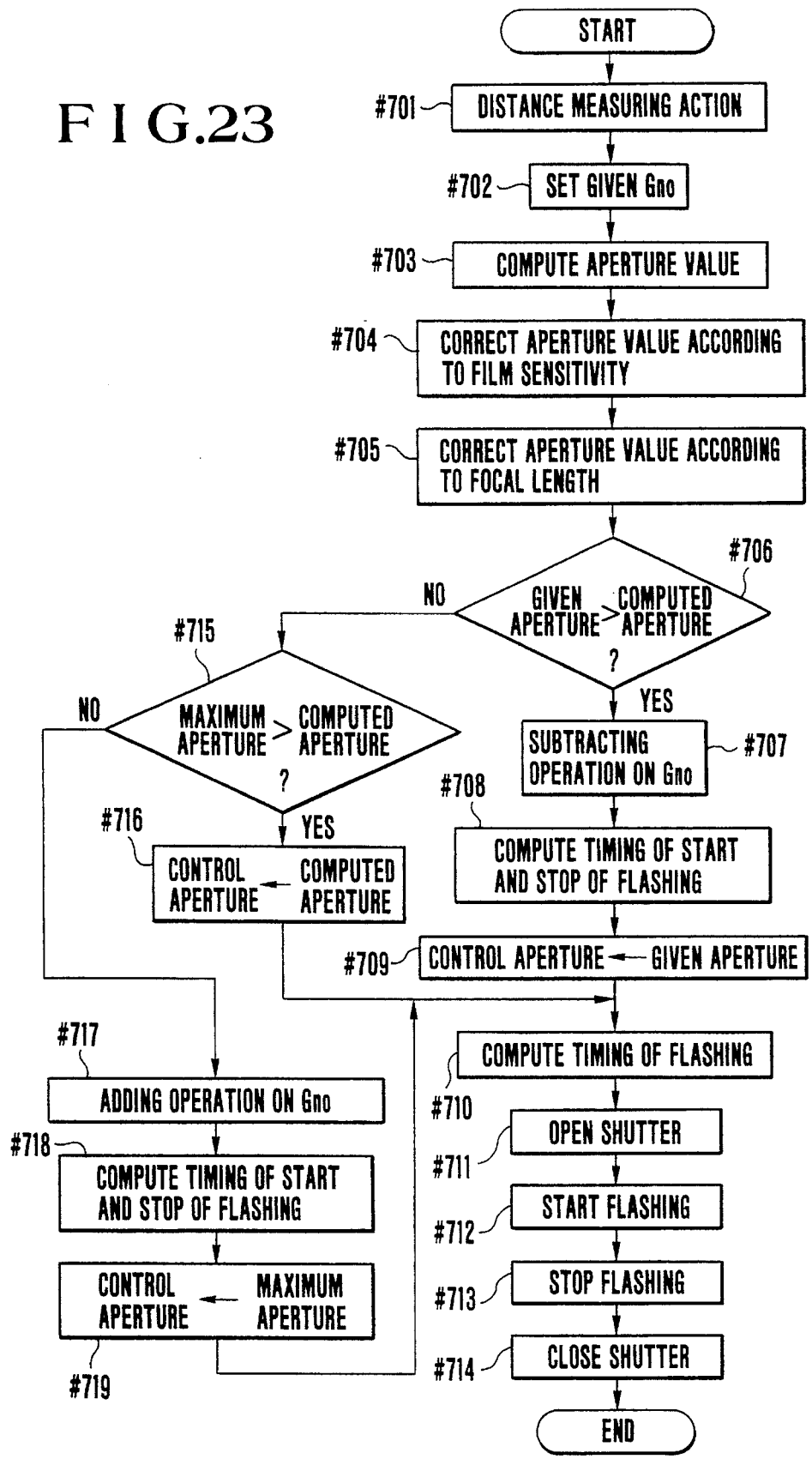
FIG. 23 is a flow chart showing the operation of a camera including a fifth embodiment of this invention.

FIG. 23 is a flow chart showing the operation of a fifth embodiment of this invention. The circuit arrangement of the fifth embodiment is similar to that of the fourth embodiment shown in FIG. 19. Therefore, the details of the arrangement are omitted from description.

When a release button which is not shown is operated to make its first stroke, the microprocessor 206 begins to execute the following steps from a step 701:

At the step 701, the distance measuring device 201 is driven to begin to measure a distance from the camera to an object to be photographed. At a step 702, a preset Gno stored beforehand is read out and set. At a step 703, the aperture computing means 204 is caused to compute an aperture value to be used at the time of flashing on the basis of information on the object distance obtained by the step 701 and the preset aperture value set at the step 702. At a step 704, the aperture value obtained by the step 703 is corrected according to information on the film sensitivity obtained from the film sensitivity detecting means 202. At a step 705, the aperture value obtained by the step 704 is further corrected according to information on the focal length obtained from the lens focal length detecting means 203.

At a step 706, the flashing amount deciding means 205 is caused to compare a preset aperture value which is preset by the flashing amount deciding means 205 and the computed aperture value obtained by the aperture computing means 204 (the aperture value obtained by the step 705) with each other. If the computed aperture value is smaller than the preset aperture value, the flow proceeds to a step 707. If the former is larger than the latter, the flow comes to a step 715. At the step 707, a Gno value corresponding to a difference between the computed aperture value and the preset aperture value is subtracted from a preset Gno and the result of subtraction is considered to be a Gno to be used in taking a shot.

At a step 708, a length of time between the start and stop of flashing at which the Gno obtained by the step 707 is attainable is computed. At a step 709, since the computed aperture value is smaller than the preset aperture value in this case, the aperture value with which flash light is to be actually emitted (hereinafter referred to as control aperture value) is changed to the preset aperture value. At a step 710, a length of time from the start of energizing the shutter until immediately before the start of flashing during which the aperture reaches the control aperture value is computed. At a step 711, the shutter is opened by actually applying a current to the shutter. At a step 712, flashing is allowed to begin after the lapse of the time computed by the step 710. At a step 713, the flashing is brought to a stop after the lapse of time computed at the step 708 from the start of the flashing. At a step 714, the shutter is closed by cutting off the current applied to the shutter after the lapse of a preset period of time. An exposure action thus comes to an end.

If the computed aperture value is found to be larger than the preset aperture value at the step 706, the flow comes to the step 715 as mentioned above. At the step 715, the computed aperture value is compared with a maximum aperture value. If the computed aperture value is smaller than the maximum aperture value, the flow proceeds to a step 716. If the former is larger than the latter, the flow comes to a step 717. At the step 716, since the computed aperture value is smaller than the maximum aperture value in this case, the computed aperture value is set at the control aperture value. The flow then comes to execute the step 710 and the steps following it.

In a case where the computed aperture value is found to be larger than the maximum aperture value at the step 715, the flow comes to the step 717 as mentioned above. At the step 717, a difference between the computed aperture value and the maximum aperture value is computed to find by how much the former is larger than the latter. A Gno value corresponding to this difference is added to the Gno. At a step 718, a length of time between the start and stop of flashing is computed to make the flash light quantity to be emitted coincide with the Gno thus obtained as a result of addition. At a step 719, the maximum aperture value is decided to be the control aperture value. The flow comes to execute the step 710 and the steps following the step 710.

Figure 24:
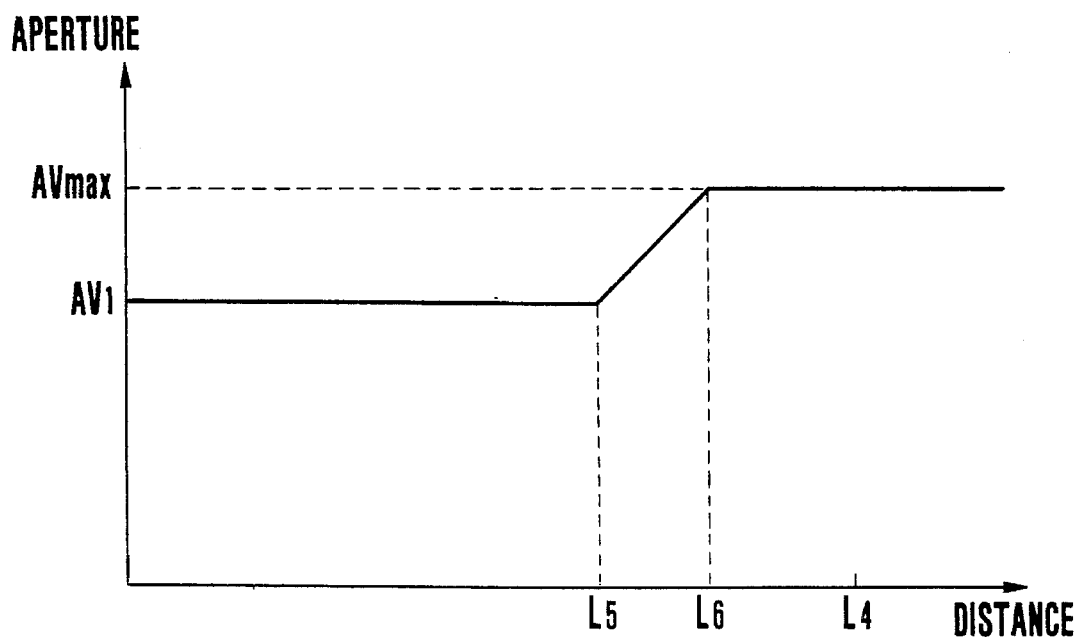
FIG. 24 is a graph showing a relation obtained between the object distance and the aperture value in the operation of the camera shown in FIG. 23.
Figure 25:
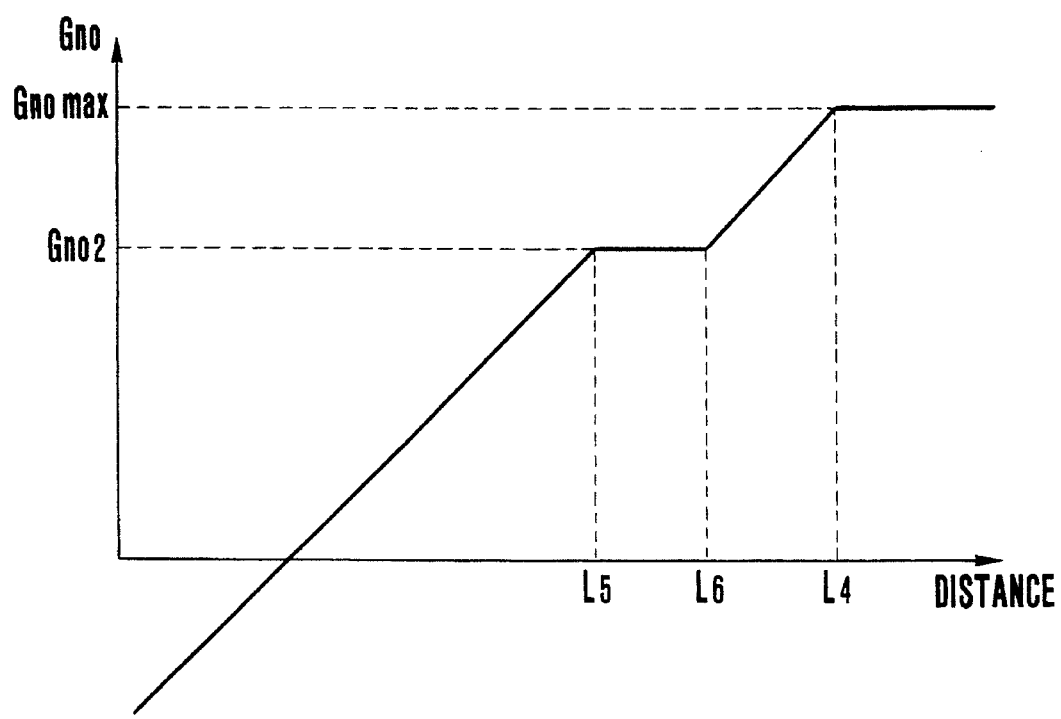
FIG. 25 is a graph showing a relation obtained between the object distance and the Gno in the operation of the camera shown in FIG. 23.

Next, the relation of the object distance to the aperture value is described with reference to FIG. 24 and the relation of the object distance to the Gno is described with reference to FIG. 25 as follows:

In a case where the object distance obtained at the step 701 of FIG. 23 is nearer than a distance point L5, the computed aperture value becomes smaller than the preset aperture value (AV1) and is controlled with a Gno which is obtained by subtracting a Gno value corresponding to a difference "the preset aperture value—the computed aperture value" from the preset Gno (Gno2). If the object distance is between distance points L6 and L4, the computed aperture value is larger than the preset aperture value AV1 and is smaller than the maximum aperture value AVmax. In this case, the aperture value is set at the control aperture value and the Gno is controlled with a Gno obtained by adding a Gno value corresponding to a difference "the maximum aperture value—the computed aperture value" to the preset Gno.

Each of the fourth and fifth embodiments is arranged to compute an aperture value for flashing on the basis of the object distance information obtained from the distance measuring device, and to lower the Gno as much as a difference between the computed aperture value and the preset aperture value when the former is smaller than the latter. In the case of the fifth embodiment, the aperture value is increased, if the computed aperture value is larger than the preset aperture value and smaller than the maximum aperture, or the Gno is increased as much as a difference between the aperture value and the maximum aperture if the aperture value is larger than the maximum aperture. Therefore, unlike the conventional flash light control device, these embodiments obviate the necessity of any additional optical system, any additional electric circuit and any additional fitting arrangement. The arrangement of these embodiments thus best suits to the recent low-cost cameras having various functions.

Further, unlike the conventional flash light control device, these embodiments are capable of taking pictures always with a constantly adequate light quantity on the image plane without being affected by the reflection factor of the object to be photographed and those of the things around the object.

EMBODIMENT VI

The sixth embodiment of this invention is a flash light control device which is an improvement over the fourth embodiment described in the foregoing. The fourth embodiment is arranged to compute an aperture value to be used at the time of flashing on the basis of object distance information obtained from the distance measuring device and to lower the Gno as much as a difference between the computed aperture value and a preset aperture value if the computed aperture value is smaller than the preset aperture value. However, in actuality, the Gno cannot be unlimitedly lowered while maintaining linearity due to fluctuations in electrical characteristic of parts and unevenness among cameras. It is, therefore, necessary to set a minimum Gno for a stable action. Whereas, in the fourth embodiment, no heed is taken to a case where the adjustment of the Gno comes to exceed a stably lowerable limit to the Gno. The sixth embodiment is arranged by way of example to solve this problem.

Figure 26:
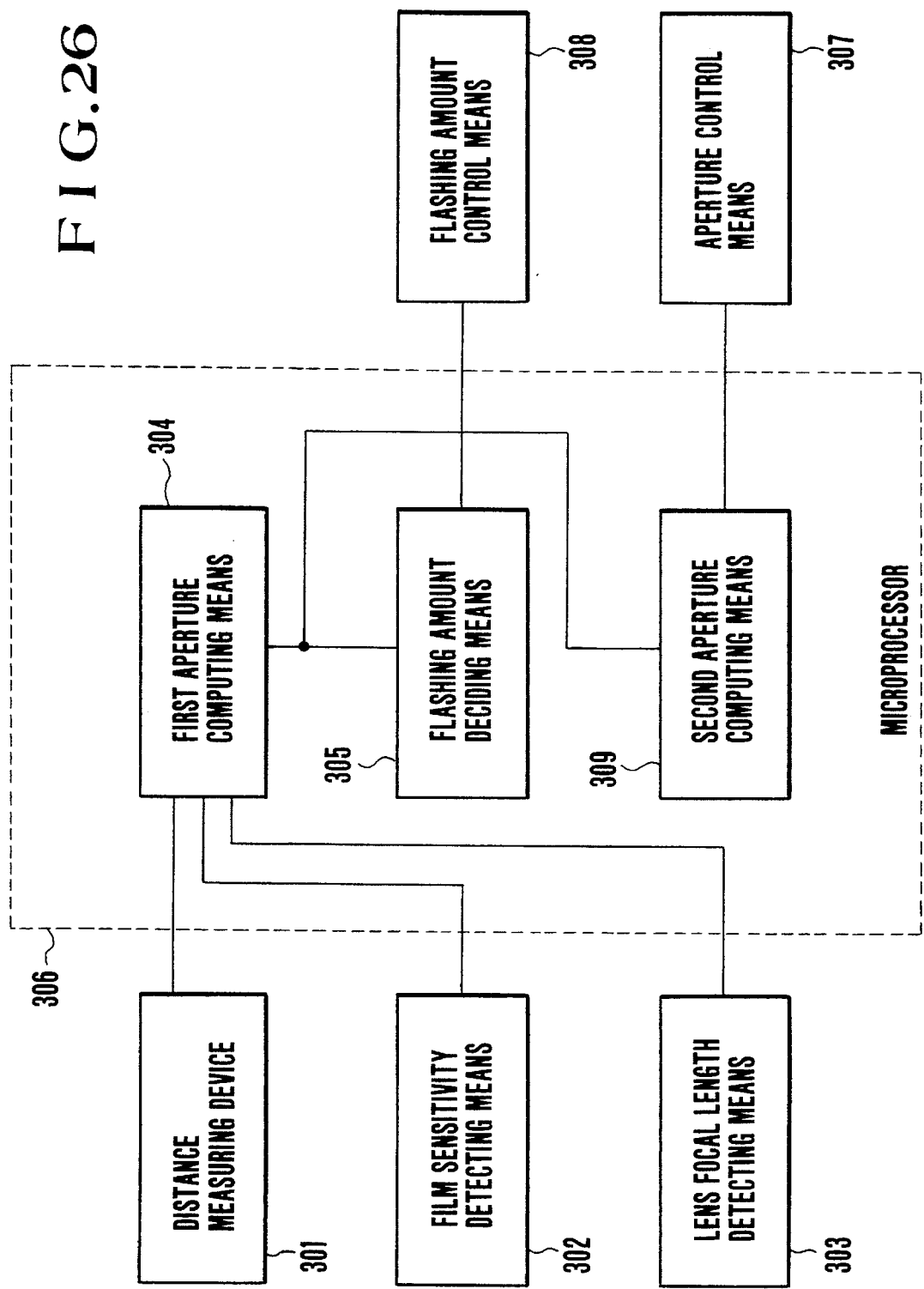
FIG. 26 is a block diagram showing in outline the arrangement of a camera which is provided with a sixth embodiment of this invention.

FIG. 26 is a block diagram showing the arrangement of essential parts of a lens-shutter type camera which includes the sixth embodiment of this invention. Referring to FIG. 26, a known distance measuring device 301 is arranged to measure a distance from the camera to an object to be photographed. Film sensitivity detecting means 302 is arranged to detect the sensitivity of a film in use from a DX code provided on the surface of a film cartridge. Lens focal length detecting means 303 is arranged to detect the focal length of the lens which is, for example, a zoom lens. First aperture computing means 304 is arranged to compute an aperture value to be used at the time of flashing on the basis of object distance information obtained from the distance measuring device 301, to correct the aperture value according to the film sensitivity detected and also according to information on the lens focal length, and to transmit information on a deficiency or an excess of light quantity relative to a preset aperture value to flashing amount deciding means 305. The flashing amount deciding means 305 is arranged to compute a flashing amount of light for correcting the deficiency or excess relative to the preset aperture value. A microprocessor 306 includes the above-stated first aperture computing means 304, the flashing amount deciding means 305 and a second aperture computing means 309 and is arranged to perform overall control over the various circuits of the camera and those of the flash light control device. Aperture control means 307 is arranged to control the aperture value to be used for flashing on the basis of information from the second aperture computing means 309. Flashing amount control means 308 includes the various circuits of the flash light control device and is arranged to control the flashing amount of light to make it coincide with the flashing amount set by the flashing amount deciding means 305. The second aperture computing means 309 is arranged such that, in a case where the flashing amount deciding means 305 demands a Gno less than a minimum Gno on the basis of Gno information, the second aperture computing means 309 corrects the computed aperture value obtained by the first aperture computing means 304 by computing a difference between the Gno and the minimum Gno and by using the difference in correcting the computed aperture value.

FIG. 2 is a circuit diagram showing by way of example the arrangement of the above-stated flashing amount control means 308 which is provided for varying the amount of flashing as described above. Referring to FIG. 2, a main capacitor 21 is arranged to accumulate energy for flashing. A xenon lamp 22 is provided for flashing. Flash light emission means 23 is arranged to cause flashing by exciting the xenon lamp 22. A switching element 24 is arranged between the xenon lamp 22 and the main capacitor 21 to cause a flashing current to flow or to be cut off halfway during the process of flashing. Flashing amount varying means 25 is arranged to vary the flashing amount by controlling the switching element 24. Flash device charging means 26 is connected to a battery 27 which is a power source. The charging means 26 is arranged to boost the voltage of the battery 27 up to a predetermined level and to have its electric charge accumulated by the main capacitor 21.

FIG. 3 shows in a flow chart the operation of the flashing amount control means 308 which is described above with reference to FIG. 2. The flow of operation of the flashing amount control means 308 is described below with reference to FIG. 3:

At a step 101, when a charging start signal is inputted from the microprocessor 306 shown in FIG. 26, the flash device charging means 26 is caused to begin to charge the mail capacitor 21. At a step 102, a check is made to find if the main capacitor 21 has been charged up to a given amount. If not, the flow of operation remains at this step. If so, the flow proceeds to a step 103. At the step 103, a check is made, through a control signal coming from the camera body, to find if a shutter release switch which is not shown but is arranged to be turned on by a second stroke of a release button is in an on-state. If not, the flow remains at the step 103. When the release switch is turned on after that, the flow proceeds to a step 104. At the step 104, a picture taking action begins with the release switch turned on. Following this action, the flashing amount varying means 25 turns the switching element 24 on. At a step 105, when the time to flash comes, the flash light emission means 23 outputs a trigger signal to excite the xenon lamp 22. This causes flashing to begin. At a step 106, a check is made to find if a given period of time has elapsed after commencement of flashing. If so, the flow remains at the step 106. Upon the lapse of this period of time, the flow proceeds to a step 107. At the step 107, the flashing amount varying means 25 causes the switching element 24 to turn off to being the flashing to a stop. A flashing amount control action thus comes to an end.

FIG. 4 shows the period of time from the start of flashing until the switching element 24 turns off in relation to the amount of flashing. FIG. 5 shows the period of time from the start of flashing until the turning-off of the switching element 24 in relation to the Gno.

Premature stopping of the flashing lowers both the flashing amount and the Gno. The flashing amount and the Gno increase with time.

FIG. 6 is a circuit diagram showing another example of arrangement of the flashing amount control means 308 which is shown in FIG. 26 and provided for the purpose of varying the amount of flash light emission.

Referring to FIG. 6, a main capacitor 31 is arranged to accumulate energy for flashing by the flash device. A xenon lamp 32 is provided for flashing. Flash light emission means 33 is arranged to cause flashing to begin by exciting the xenon lamp 32. A choke coil 34 is arranged between the xenon lamp 32 and the main capacitor 31 to prevent any sudden change from taking place in a flashing current. A switching element 35 is arranged to turn on to cut off flashing halfway by bypassing the current of the xenon lamp 32 during the process of flashing. Flashing amount varying means 36 is arranged to vary the amount of flashing by controlling the switching element 35. Flash device charging means 37 is connected to a battery 38 which is a power source. The charging means 37 is thus arranged to boost the voltage of the battery 38 up to a predetermined level and to have its electric charge accumulated at the main capacitor 31.

FIG. 7 is a flow chart showing the operation of the flashing amount control means 308 arranged as shown in FIG. 6. The operation is described with reference to FIG. 7 as follows: At a step 201, the flash device charging means 37 is caused to begin charging the main capacitor 31 with a charging start signal inputted from the microprocessor 306 shown in FIG. 26. At a step 202, a check is made to find if the main capacitor 31 has been charged to a given amount. If not, the flow of operation remains at this step. When the main capacitor 31 is charged to the given amount, the flow proceeds to a step 203. At the step 203, a check is made, through a signal coming from the camera body, to find if a shutter release switch which is not shown but is arranged to be turned on by a second stroke of a release button has been turned on. If not, the flow remains at the step 203. When the release switch turns on, the flow proceeds to a step 204.

At the step 204, when the time to flash comes, the flash light emission means 33 outputs a trigger signal to excite the xenon lamp 32. With the xenon lamp 32 excited, flashing begins. At a step 205, a check is made for the lapse of a given period of time after the start of flashing. If the period of time has not elapsed as yet, the flow remains at the step 205. After the lapse of this period of time, the flow proceeds to a step 206.

At the step 206, the flashing amount varying means 36 turns the switching element 35 on to cut off the flashing by bypassing the flashing current. At a step 207, the flow waits for the lapse of a fixed period of time. At a step 208, the flashing is brought to a stop by turning the switching element 35 off. A flashing amount control action thus comes to an end.

While the operation of the flashing amount control means 308 has been described for each of different arrangements with reference to FIGS. 3 and 7, the possible arrangements of the flashing amount control means are not limited to these examples. The flashing amount control means 308 may be arranged in any other manner as long as the flashing amount is controllable. Other possible arrangements include, for example, an ordinary DC light control type using a commutating capacitor, a type having a plurality of main capacitors and arranged to use them through switch-over means and a type inserting a resistor in between a xenon lamp and a main capacitor and arranged to vary the resistance value of the resistor.

Figure 27:
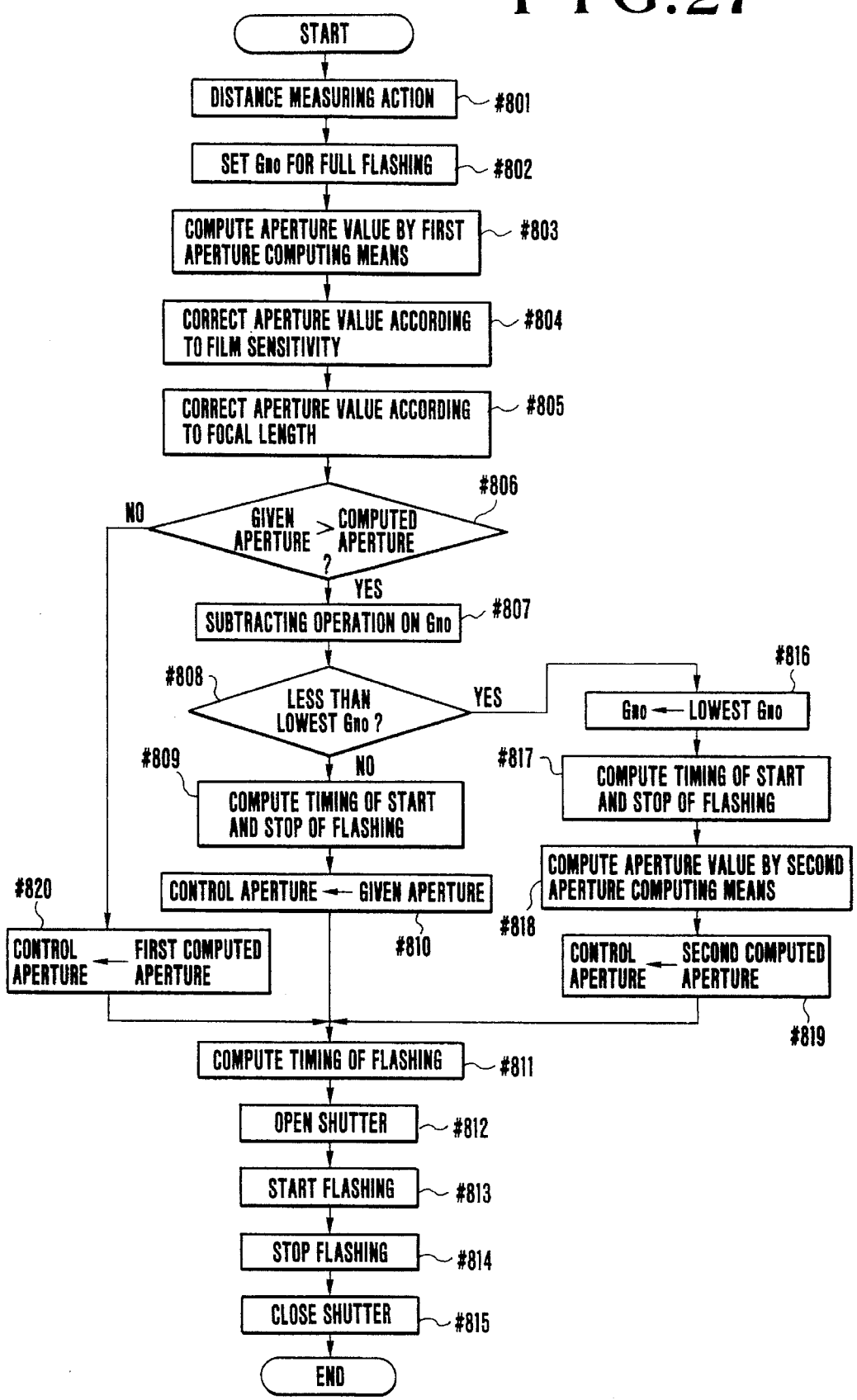
FIG. 27 is a flow chart showing the operation of the camera of FIG. 26.

FIG. 27 is a flow chart showing the operation of the parts of the camera of FIG. 26 which are related to this invention. The flow of operation is described with reference to FIG. 27 as follows:

When a release button which is not shown is operated to make its first stroke, the microprocessor 306 begins to operate from a step 801. At the step 801, the distance measuring device 301 is driven to begin to measure a distance from the camera to an object to be photographed. At a step 802, a Gno which is applicable to full flashing and stored beforehand is read out and set. At a step 803, an aperture value to be used at the time of flashing is computed on the basis of information on the object distance obtained at the step 801 and the Gno for full flashing set at the step 802. At a step 804, in relation to a distance code obtained by the step 802 (or a Gno obtained by the step 803), a correction is made according to film sensitivity information obtained from the film sensitivity detecting means 302. At a step 805, the aperture value obtained by the step 804 is further corrected according to focal length information obtained from the lens focal length detecting means 303. An aperture value is thus decided (hereinafter this aperture value is referred to as a first computed aperture value).

At a step 806, a preset aperture value which has been set beforehand is compared with the first computed aperture value obtained by the first aperture computing means 304. If the first computed aperture value is smaller than the preset aperture value, the flow of operation proceeds to a step 807. If the former is larger than the latter, the flow comes to a step 820. At the step 807, a Gno value corresponding to a difference between the first computed aperture value and the preset aperture value is subtracted from the full flashing Gno. At a step 808, a check is made to find if the Gno which is obtained by subtraction at the step 807 is smaller than a minimum Gno. If so, the flow comes to a step 816. If the former is larger than the latter, the flow proceeds to a step 809. At the step 809, timing for bringing the flashing to a stop at a point where the Gno obtained by the step 807 is attained is computed. At a step 810, since the first computed aperture value is smaller than the preset aperture value in this case, the aperture value to be used for actual flashing (hereinafter referred to as a control aperture value) is changed to the preset aperture value. At a step 811, a length of time from the start of energizing the shutter until immediately before the start of flashing, during which the aperture reaches the control aperture value, is computed. At a step 812, the shutter is opened by actually applying a current to the shutter. At a step 813, flashing is allowed to begin after the lapse of the length of time computed at the step 811, i.e., after the lapse of a period of time during which the aperture position is considered to reach the control aperture value. At a step 814, the flashing is brought to a stop after the lapse of the length of time set at the step 809 from the start of flashing. At a step 815, the shutter is closed by cutting off the current applied to the shutter after the lapse of a preset period of time. An exposure action thus comes to an end.

If the first computed aperture value is found to be larger than the preset aperture value at the step 806, the flow comes, as mentioned above, to a step 820. At the step 820, the control aperture value to be used for actual flashing is set at the first computed aperture value. The flow then proceeds to execute the steps 811 to 815.

If the Gno computed by the step 807 is found to be less than the minimum Gno at the step 808, the flow comes, as mentioned above, to a step 816. At the step 816, the Gno under the control is set at the minimum Gno. At a step 817, time for stopping the flashing for the minimum Gno is computed. At a step 818, a difference between the minimum Gno and the computed Gno is computed by the second aperture computing means 309. A value corresponding to this difference is subtracted from the preset aperture value to obtain an aperture value (hereinafter, this aperture value is referred to as a second computed aperture value). At a step 819, the control aperture value is set at the second computed aperture value. The flow then proceeds to execute the step 811 and the steps following the step 811.

The relation of the object distance to the aperture value is described below with reference to FIG. 28 and the relation of the object distance to the Gno is also described below with reference to FIG. 29.

Figure 28:
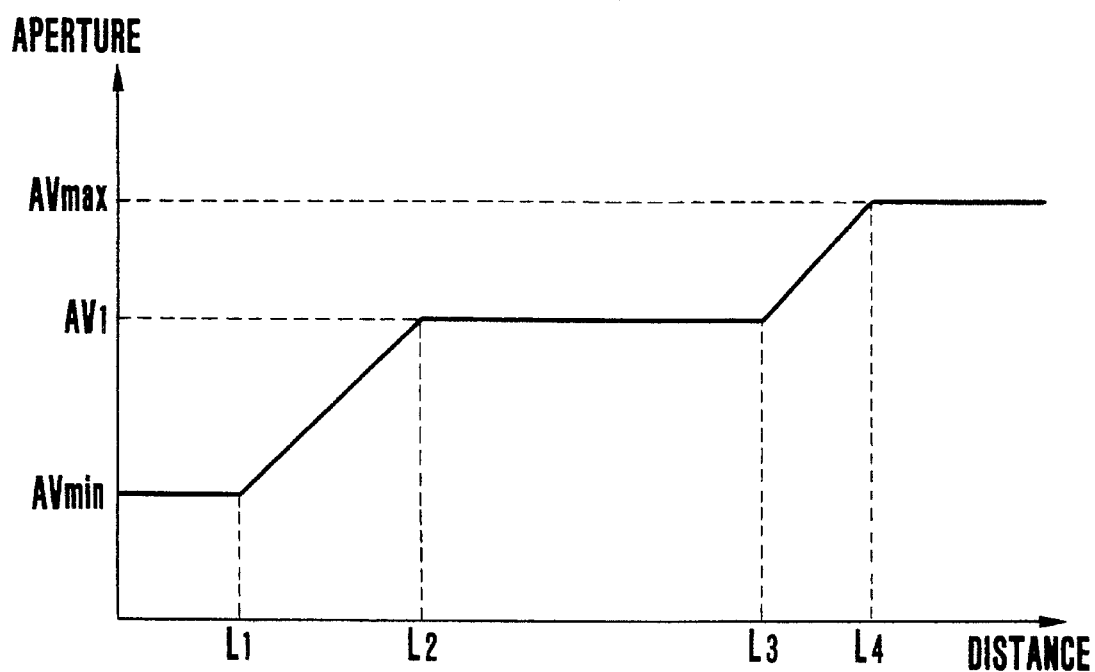
FIG. 28 is a graph showing a relation obtained between the object distance and the aperture value in the operation of the camera shown in FIG. 26.
Figure 29:
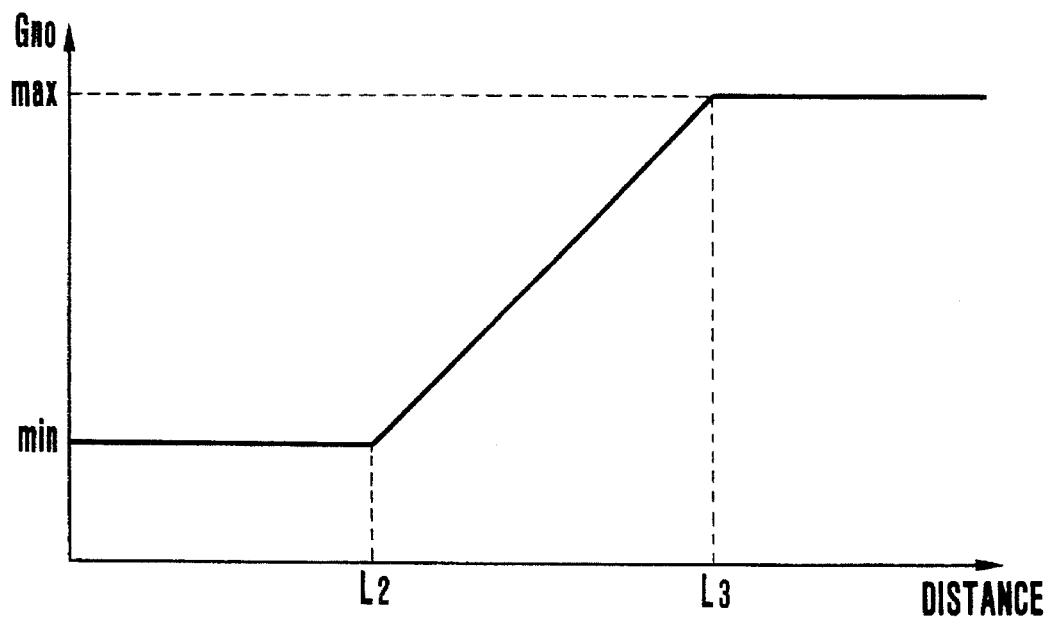
FIG. 29 is a graph showing a relation obtained between the object distance and the Gno in the operation of the camera shown in FIG. 26.

In a case where the object distance obtained at the step 801 of FIG. 27 is farther than a distance point L4 shown in FIGS. 28 and 29, the first computed aperture value becomes a maximum aperture value AVmax, which is naturally larger than the preset aperture value AV1. In this case, the control aperture value becomes the computed aperture value (i.e., a maximum aperture value AVmax) while the Gno becomes the full flashing Gno. If the object distance is between the distance point L4 and a distance point L3, the first computed aperture value is smaller than the maximum aperture value AVmax but is larger than the preset aperture value AV1. In that case, therefore, the control aperture value becomes the first computed aperture value and the Gno becomes the full flashing Gno.

If the object distance is between the distance point L3 and a distance point L2, the first computed aperture value is smaller than the preset aperture value AV1. The control aperture value, therefore, becomes the preset aperture value. The Gno is then controlled and adjusted to a Gno for a flash light quantity obtainable by subtracting, from the full flashing Gno, a Gno value corresponding to a difference "the preset aperture value—the first computed aperture value". Further, in a case where the object distance is between the distance point L2 and a distance point L1, the first computed aperture value is naturally smaller than the preset aperture value AV1. However, if the Gno is lowered as much as a difference between the first computed aperture value and the preset aperture value, the Gno becomes smaller than a minimum Gno. Therefore, in that case, the aperture is controlled by the second computed aperture value which is obtained by subtracting, from the preset aperture value, a value corresponding to a difference "the computed Gno—the minimum Gno". The Gno is then controlled to be the minimum Gno. Further, if the object distance is nearer than the distance point L1, the control aperture value is controlled to be at the minimum aperture value and the Gno is controlled to be at the minimum Gno. However, in this instance, the control results in an over-exposure, because the actual condition is beyond a controllable range.

In accordance with the arrangement of the sixth embodiment described, the method whereby an aperture value to be used at the time of flashing is computed on the basis of the measured distance information and the Gno is lowered as much as a difference between a preset aperture value and the computed aperture value if the computed aperture value is less than the preset aperture value can be advantageously carried out, because: After the lowered Gno reaches a minimum value for stably lowering the Gno, the aperture value is lessened as much as a value corresponding to a difference between the minimum Gno and the necessary (or computed) Gno. Therefore, the flashing amount can be appositely obtained over a wide range without being affected by the fluctuations and unevenness of parts and cameras.

EMBODIMENT VII

A seventh embodiment of this invention is an improvement over the fifth embodiment described in the foregoing. The fifth embodiment is arranged to compute an aperture value for flashing on the basis of object distance information from the distance measuring device and, if the computed aperture value is smaller than a preset aperture value, to lower the Gno as much as a difference between the computed aperture value and the preset aperture value. However, in actuality, it is impossible to unlimitedly lower the Gno while maintaining linearity due to fluctuations in electrical characteristic of parts and unevenness of cameras. This problem calls for setting a minimum Gno. However, the fifth embodiment includes no arrangement against a case where the lowered Gno becomes less than a minimum Gno which is a stably lowerable limit. The seventh embodiment is arranged to make an improvement in this respect.

Figure 30:
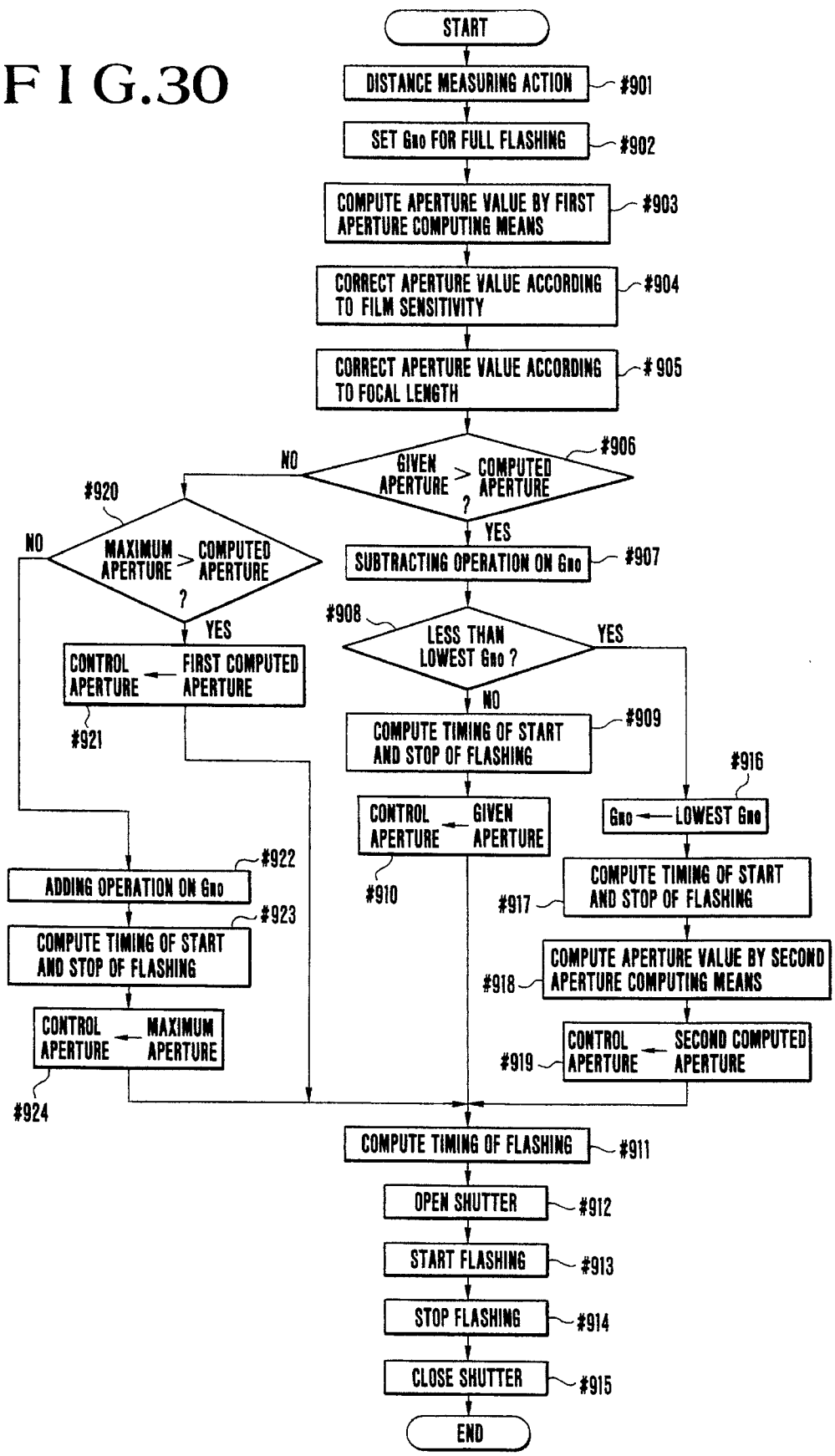
FIG. 30 is a flow chart showing the operation of a camera which is provided with a seventh embodiment of this invention.

FIG. 30 is a flow chart showing the operation of the seventh embodiment. The circuit arrangement of the seventh embodiment is similar to that of the sixth embodiment shown in FIG. 26 and is, therefore, omitted from description. The flow of operation of the seventh embodiment is described below with reference to FIG. 30.

When a release button which is not shown is operated to make its first stroke, the microprocessor 306 begins to operate from a step 901. At the step 901, the distance measuring device 301 is driven to begin to measure a distance from the camera to an object to be photographed. At a step 902, a preset Gno which is stored is read out and set. At a step 903, the first aperture computing means 304 computes an aperture value to be used at the time of flashing on the basis of object distance information obtained by the step 901 and the preset Gno set at the step 902. At a step 904, the aperture value obtained by the step 903 is corrected according to film sensitivity information which is obtained from the film sensitivity detecting means 302. At a step 905, the aperture value obtained by the step 904 is further corrected according to focal length information obtained from the lens focal length detecting means 303. An aperture value thus obtained is hereinafter referred to as a first computed aperture value. At a step 906, a preset aperture value is compared with the first computed aperture value computed by the first aperture computing means 304. If the first computed aperture value is found to be smaller than the preset aperture value, the flow of operation proceeds to a step 907. If the former is larger than the latter, the flow comes to a step 920.

At the step 907, a Gno value corresponding to a difference between the first computed aperture value and the preset aperture value is subtracted from the preset Gno. At a step 908, a check is made to find if the Gno obtained by the subtraction at the step 907 is smaller than a minimum Gno. If so, the flow comes to a step 916. If the former is found to be larger than the latter, the flow comes to a step 909. At the step 909, the flashing amount deciding means 305 computes a length of time between the start and stop of flashing by which the Gno obtained by the step 907 can be attained. At a step 910, since the first computed aperture value is smaller than the preset aperture value in this case, the aperture value to be used for actual flashing (hereinafter referred to as a control aperture value) is changed to the preset aperture value. At a step 911, a length of time from the start of energizing the shutter until immediately before the start of flashing, during which the aperture becomes the above-stated control aperture value, is computed. At a step 912, the shutter is opened by actually applying a current to the shutter. At a step 913, flashing is allowed to begin after the lapse of time computed by the step 911. At a step 914, the flashing is brought to a stop after the lapse of the length of time decided by the step 909. At a step 915, the shutter is closed by cutting off the current applied to the shutter after the lapse of a preset period of time. An exposure comes to an end.

If the first computed aperture value is found to be larger than the preset aperture value at the step 906, the flow comes, as mentioned above, to the step 920. At the step 920, the first computed aperture value is compared with a maximum aperture value. If the aperture of the first aperture value is smaller than that of the maximum aperture value, the flow proceeds to a step 921. If the former is larger than the latter, the flow comes to a step 922. At the step 921, since the aperture of the first computed aperture value is smaller than that of the maximum aperture value, the control aperture value is set at the first computed aperture value. The flow then comes to execute the step 911 and the steps following it.

In a case where the aperture of the first computed aperture value is found to be larger than that of the maximum aperture value, the flow comes to the step 922 as mentioned above. At the step 922, a difference between the first computed aperture value and the maximum aperture value is computed to find how much the former is larger than the latter. Then, a Gno value corresponding to this difference is added to the preset Gno. At a step 923, timing for stopping flashing by which the Gno obtained as a result of the addition is attainable is computed. At a step 924, the control aperture value is set at the maximum aperture value and the flow comes to the step 911 to execute the step 911 and the steps following it.

If the Gno computed by the step 907 is found to be less than the minimum Gno at the step 908, the flow comes to the step 916 as mentioned above. At the step 916, the Gno under control is set at the minimum Gno. At a step 917, timing for stopping flashing which corresponds to the minimum Gno is computed. At a step 918, the second aperture computing means 309 computes a difference between the minimum Gno and the necessary (or controlled) Gno and subtracts a value corresponding to this difference from the preset aperture value. An aperture value thus obtained is hereinafter referred to as a second computed aperture value. At a step 919, the control aperture value is set at the second computed aperture value. After that, the flow comes to the step 911 to execute the step 911 and the steps following it.

Figure 31:
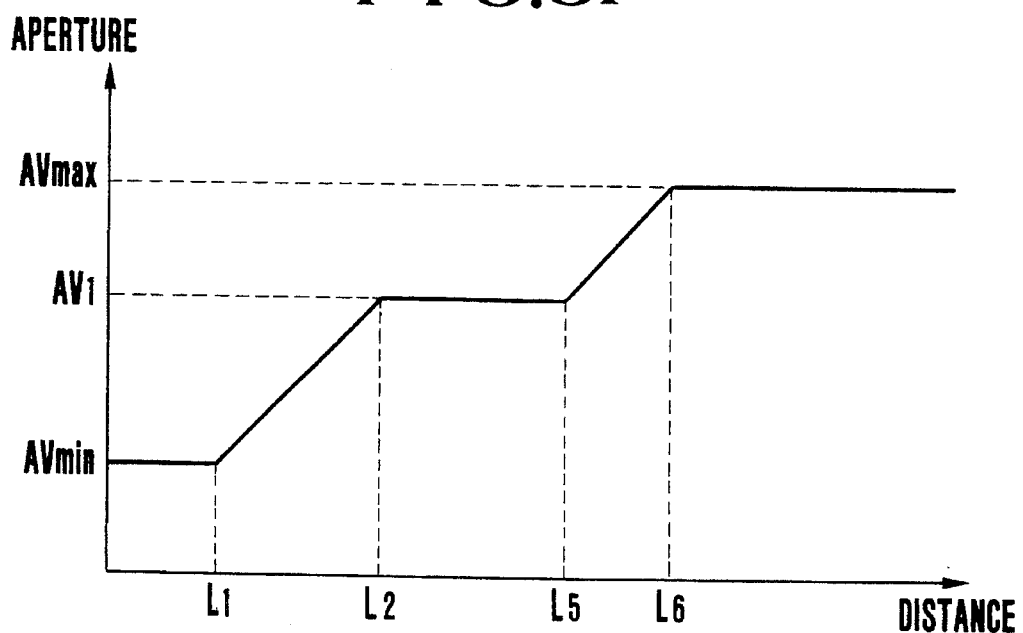
FIG. 31 is a graph showing a relation obtained between the object distance and the aperture value in the operation of the camera shown in FIG. 30.
Figure 32:
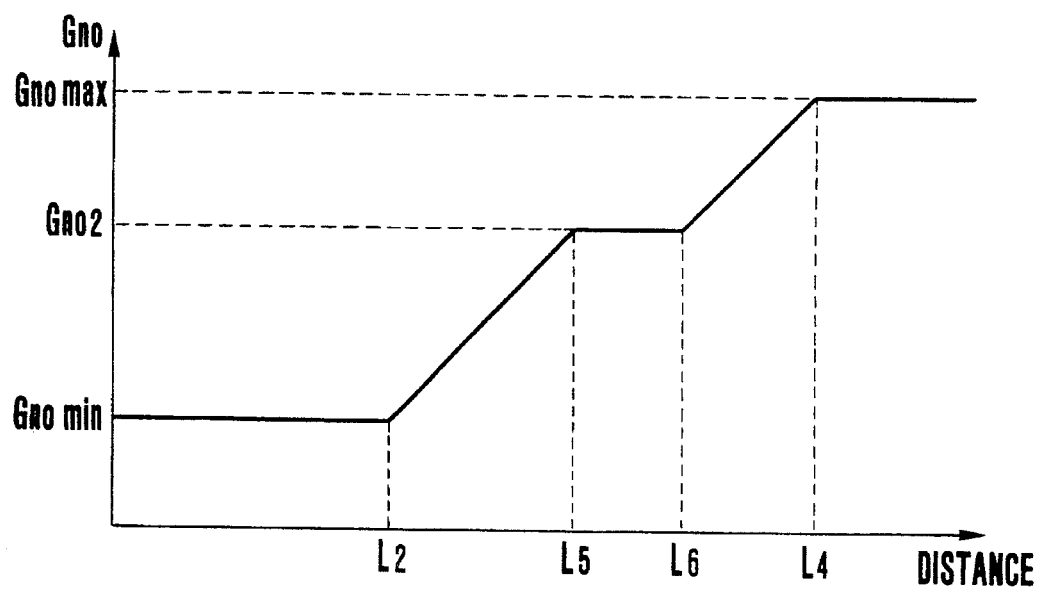
FIG. 32 is a graph showing a relation obtained between the object distance and the Gno in the operation of the camera shown in FIG. 30.

The following describes the object distance in relation to the aperture value with reference to FIG. 31 and in relation to the Gno with reference to FIG. 32.

In a case where the object distance obtained at the step 901 of FIG. 30 is located between distance points L5 and L2 as shown in FIGS. 31 and 32, the first computed aperture value is smaller than the preset aperture value AV1. In this case, therefore, the Gno is controlled by subtracting a Gno value corresponding to a difference "the preset aperture value—the first computed aperture value" from the Gno. If the object distance is between distance points L5 and L6, the first computed aperture value is larger than the preset aperture value AV1. Therefore, the control aperture value is then controlled with the first computed aperture value, and the Gno with the preset Gno.

If the object distance is located between distance points L6 and L4, the first computed aperture value is larger than the preset aperture value AV1 and is also larger than a maximum aperture value AVmax. In this case, the control aperture value is set at the maximum aperture value AVmax and the Gno is controlled with a Gno which is obtained by adding to the preset Gno a value corresponding to a difference "the maximum aperture value —the first computed aperture value". If the object distance is farther than the distance point L4, the control process is carried out in the same manner as in the case of the object distance between the points L6 and L4. However, since the Gno exceeds the full flashing Gno, the control aperture value becomes the maximum aperture value AVmax and the Gno becomes the full flashing Gno to exceed the range of possible control. Therefore, the control results in an under-exposure.

In a case where the object distance is located between distance points L2 and L1, the first computed aperture value is naturally smaller than the preset aperture value AV1. However, if the Gno is lowered as much as a difference between the first computed aperture value and the preset aperture value AV1, the Gno becomes less than the minimum Gno. Therefore, in that case, the aperture is controlled with the second computed aperture value which is obtained by subtracting an aperture value corresponding to a difference "the necessary Gno—the minimum Gno" from the preset aperture value. Then, the flash device is flashed at the minimum Gno. Further, if the object distance is located nearer than the distance point L1, the control aperture value becomes the minimum aperture and the flash device is flashed at the minimum Gno. However, since this condition is beyond the control range, the control results in an over-exposure.

In carrying out the method whereby an aperture value for flashing is computed on the basis of measured object distance information and the Gno is lowered as much as a difference between the computed aperture value and a preset aperture value if the former is smaller than the latter, the seventh embodiment is arranged such that: After the process of lowering the Gno reaches a minimum Gno which is a stably lowerable limit to the Gno, the aperture value is lessened as much as a value corresponding to a difference between the necessary Gno and the minimum Gno. Therefore, in accordance with the arrangement of the seventh embodiment, adequate flashing amounts are obtainable over a wide range without being affected by the fluctuations and unevenness of the parts and the cameras.

The embodiment, as described above, comprises flashing amount deciding means by which a quantity of light to be emitted, i.e., flashing amount, in allowing a flash device to flash is decided on the basis of measured object distance information from distance measuring means, aperture control means for deciding an aperture value on the basis of the flashing amount decided by the flashing amount deciding means, and flashing amount control means for controlling the quantity of flash light to make it coincide with the flashing amount decided by the flashing amount deciding means, so that the flashing amount can be automatically decided according to the measured distance information inputted.

The embodiment further comprises aperture computing means for computing an aperture value to be used at the time of flashing on the basis of the measured distance information from the distance measuring means and a preset flashing amount, flashing amount computing means which is arranged to compute a difference between the computed aperture value obtained by the aperture computing means and the preset aperture value and to decide a final flashing amount by correcting the preset flashing amount as much as a value corresponding to the difference in aperture value thus computed, and flashing amount control means for controlling the quantity of flash light to make it coincide with the flashing amount decided by the flashing amount computing means. The embodiment is thus arranged to compute an aperture value to be used at the time of flashing on the basis of the measured distance information, in the event of a difference between the computed aperture value and the preset aperture value, to correct the preset flashing amount as much as the difference in aperture value, and to use the result of correction as a final flashing amount.

The arrangement of the embodiment dispenses with an optical system, an electrical circuit and means for fitting them which are necessary for the conventional camera in receiving and processing the reflected light of flash. This is an advantage in terms of cost and space. It is another advantage that, since the reflected light of flash is not used, the invented arrangement is capable of giving always an optimum light quantity on the image plane without being affected by the reflection factor of the object and that of the background.

The embodiment further comprises flashing amount varying means. In a case where the aperture value computed by the aperture computing means is less than a preset minimum aperture value, the flashing amount varying means subtracts an amount corresponding to a difference between the computed aperture value and the preset minimum aperture value from the preset flashing amount decided by the flashing amount deciding means and instructs the flashing amount control means to use the result of subtraction as a final flashing amount. In this case, a flash light quantity corresponding to a part of the computed aperture value which is not lowerable from the minimum aperture value is thus subtracted from the flashing amount decided by flashing amount deciding means.

Further, the embodiment is provided with aperture value varying means. If the flashing amount computed by the flashing amount computing means is less than a preset minimum flashing amount, the aperture value varying means subtracts a value corresponding to a difference between the computed flashing amount and the minimum flashing amount from the aperture value computed by the aperture value computing means and instructs the aperture value computing means to use the result of subtraction as a final aperture value. In that case, the aperture of the aperture value computed by the aperture value computing means is thus reduced to a smaller aperture as much as a value corresponding to a part of the computed flashing amount which is not lowerable from the minimum flashing amount. A reduced aperture value thus obtained is used as a final aperture value.

The embodiment is thus arranged not only to attain the object of this invention mentioned in the foregoing but also to give an optimum image plane light quantity over a wide range of flashing amounts.

What is claimed is:

1. A camera having a shutter which serves also as a diaphragm comprising:
   a) distance detecting means arranged to detect a distance to an object and to output distance information;
   b) flash amount deciding means for varying an amount of flash emission on the basis of the distance information from said distance detecting means;
   c) aperture value deciding means for varying an aperture value of the shutter to be used at the time of starting flash emission, on the basis of said amount of flash emission; and
   d) a light emission control circuit for controlling a quantity of light to be emitted by a flash, said control circuit being arranged to illuminate in the course of the moving operation for the shutter.

2. A camera according to claim 1, wherein said flash amount deciding means selects, on the basis of said distance information, said amount of flash emission from a table of amounts of flash emission stored beforehand as memory information.

3. A camera according to claim 1, wherein said flash amount deciding means obtains said amount of flash emission by computation on the basis of said distance information.

4. A camera according to claim 1, wherein said aperture value deciding means obtains said aperture value by computation on the basis of said amount of flash emission.

5. A camera according to claim 1, further comprising:
   aperture control means for controlling an aperture of the shutter, said aperture control means being arranged to cause the shutter to shift the aperture from a closed position to an open position and, after that, to shift the aperture from the open position to the closed position.

6. A camera according to claim 1, wherein said light emission control circuit is arranged to control a length of time of light emission by the flash on the basis of said amount of flash emission, and to control time for the start of light emission by the flash on the basis of said aperture value at the time of shift of the shutter from the closed position to the open position.

7. A camera having a shutter which serves also as a diaphragm, comprising:

a) distance detecting means arranged to detect a distance to an object and to output distance information;

b) deciding means for varying an amount of flash emission and an aperture value of the shutter to be used at the time of starting flash emission, on the basis of distance information from said distance detecting means; and c) a light emission control circuit for controlling a quantity of light to be emitted by a flash, said control circuit being arranged to illuminate in the course of the moving operation for the shutter.

8. A camera according to claim 7, wherein said deciding means is arranged to select, on the basis of said distance information, said amount of flash emission from a table of amounts of flash emission stored beforehand as memory information.

9. A camera according to claim 7, wherein said deciding means is arranged to obtain said amount of flash emission by computation on the basis of said distance information.

10. A camera according to claim 7, wherein said amount of flash emission and said aperture value which are decided by said deciding means have a range in which said aperture value is variable while keeping said amount of flash emission constant in relation to changes of said distance information.

11. A camera according to claim 7, wherein said amount of flash emission and said aperture value which are decided by said deciding means have a first range in which said amount of flash emission is variable while keeping said aperture value constant in relation to changes of said distance information and a second range in which said aperture value is variable while keeping said amount of flash emission constant in relation to changes of said distance information.

12. A camera according to claim 7, further comprising:

aperture control means arranged to cause the shutter to shift an aperture thereof from a closed position to an open position and, after that, to shift the aperture from the open position to the closed position.

13. A camera according to claim 7, wherein, if said aperture value decided by said deciding means is smaller than a specific aperture value, said light emission control circuit controls the light emission by the flash by subtracting an amount corresponding to a difference between said decided aperture value and said specific aperture value from said amount of flash emission.

14. A camera according to claim 7, wherein, if said amount of flash emission decided by said deciding means is smaller than a specific amount of flash emission, said light emission control circuit varies the timing for starting light emission by the flash as much as a difference between said decided amount of flash emission and said specific amount of flash emission.

15. A camera according to claim 12, further comprising:

focal length detecting means for detecting information on the focal length of a lens optical system.

16. A camera according to claim 15, wherein said light emission control circuit is arranged to correct said aperture value decided by said deciding means on the basis of said information on the focal length.

17. A camera having a shutter which serves also as a diaphragm comprising:

a) a computer;

b) distance detecting means for detecting a distance to an object by using said computer to output distance information;

c) flash amount deciding means for varying an amount of flash emission on the basis of the distance information from said distance detecting means; and d) aperture value deciding means for varying an aperture value of the shutter to be used at the time of starting flash emission, on the basis of said amount of flash emission.

18. A camera having a shutter which serves also as a diaphragm comprising:

a) a computer;

b) distance detecting means for detecting a distance to an object by using said computer to output distance information;

c) flash amount deciding means for varying an amount of flash emission on the basis of the distance information from said distance detecting means;

d) aperture value deciding means for varying an aperture value of the shutter to be used at the time of starting flash emission, on the basis of said amount of flash emission; and e) a light emission control circuit for controlling a quantity of light to be emitted by a flash, said control circuit being arranged to illuminate in the course of the moving operation for the shutter.

19. A camera according to claim 18, wherein said flash mount deciding means selects, on the basis of said distance information, said amount of flash emission from a table of amounts of flash emission stored beforehand as memory information.

20. A camera according to claim 18, wherein said flash amount deciding means obtains said amount of flash emission of computation on the basis of said distance information.

21. A camera according to claim 18 wherein said aperture value deciding means obtains said aperture value of the shutter by computation on the basis of said amount of flash emission.

22. A camera according to claim 18, further comprising:

light emission control means for controlling a quantity of light to be emitted by a flash, on the basis of said amount of flash emission decided by said flash amount deciding means; and aperture control means for controlling an aperture value of the shutter, said aperture control means being arranged to cause the shutter to shift the aperture from a closed position to an open position and, after that, to shift the aperture from the open position to the closed position.

23. A camera according to claim 22, wherein said light emission control means is arranged to control a length of time of light emission by the flash on the basis of said mount of flash emission, and to control time for the start of light emission by the flash on the basis of said aperture value at the time of shift of the aperture from the closed position to the open position.

24. A camera having a shutter which serves also as a diaphragm, comprising:

a) distance detecting means arranged to detect a distance to an object and to output distance information; and b) control means for varying an amount of flash emission on the basis of distance information from said distance detecting means, said amount of flash emission and an aperture value which are decided by control means have a first range in which said amount of flash emission is variable while keeping said aperture value constant in relation to changes of said distance information and a second range in which said aperture value is variable while keeping said amount of flash emission constant in relation to changes of said distance information.

25. A camera according to claim 24 wherein said control means is arranged to select, on the basis of said distance information, said amount of flash emission from a table of amounts of flash emission stored beforehand as memory information.

26. A camera according to claim 24, wherein said control means controls a timing for starting light emission of a flash on the basis of said amount of flash emission and said aperture value and controls a drive of the shutter from a closed position to an open position and a drive of the same position.

27. A camera according to claim 24, further comprising:
focal length detecting means for detecting information on the focal length of a lens optical system.

28. A camera according to claim 27, wherein said control means are arranged to correct said aperture value on the basis of said information on the focal length.

* * * * *

UNITED STATES PATENT AND TRADEMARK OFFICE
CERTIFICATE OF CORRECTION

PATENT NO. : 5,602,614

DATED : February 11, 1997

INVENTOR(S) : Ohtsuka et al.

It is certified that error appears in the above-identified patent and that said Letters Patent is hereby corrected as shown below:

Col. 7, line 40, delete "204 sec" and insert -- 204 μsec --.

Signed and Sealed this

Ninth Day of June, 1998

Attest:

BRUCE LEHMAN

Attesting Officer     Commissioner of Patents and Trademarks